US012800977B2

(12) United States Patent
Teng et al.

(10) Patent No.: US 12,800,977 B2
(45) Date of Patent: Nov. 17, 2026

(54) TUNABLE OPTICAL DEVICE AND METHOD OF FORMING THE SAME

(71) Applicants: Agency for Science, Technology and Research, Singapore (SG); National University of Singapore, Singapore (SG)

(72) Inventors: Jinghua Teng, Singapore (SG); Arash Nemati, Singapore (SG); Minghui Hong, Singapore (SG)

(73) Assignees: Agency for Science, Technology and Research, Singapore (SG); National University of Singapore, Singapore (SG)

( * ) Notice: Subject to any disclaimer, the term of this patent is extended or adjusted under 35 U.S.C. 154(b) by 470 days.

(21) Appl. No.: 17/793,386

(22) PCT Filed: Jan. 7, 2021

(86) PCT No.: PCT/SG2021/050005
§ 371 (c)(1),
(2) Date: Jul. 16, 2022

(87) PCT Pub. No.: WO2021/145819
PCT Pub. Date: Jul. 22, 2021

(65) Prior Publication Data

US 2023/0105985 A1 Apr. 6, 2023

(30) Foreign Application Priority Data

Jan. 17, 2020 (SG) .......................... 10202000476R

(51) Int. Cl.
*G02F 1/29* (2006.01)
*G02B 1/00* (2006.01)

(52) U.S. Cl.
CPC ............ *G02F 1/292* (2013.01); *G02B 1/002* (2013.01); *G02F 2201/346* (2013.01)

(58) Field of Classification Search
CPC ..... G02F 1/292; G02B 5/1809; G02B 5/1871; G02B 1/002
See application file for complete search history.

(56) References Cited

U.S. PATENT DOCUMENTS

| | | | | |
|---|---|---|---|---|
| 7,557,979 B2 * | 7/2009 | Cicchiello | G02F 1/292 359/254 |
| 10,670,941 B2 * | 6/2020 | Park | G02F 1/29 |

(Continued)

FOREIGN PATENT DOCUMENTS

| | | | |
|---|---|---|---|
| KR | 20080087581 A * | 10/2008 |
| WO | 0045202 A1 | 8/2000 |

OTHER PUBLICATIONS

Holloway et al., "An Overview of the Theory and Applications of Metasurfaces: The Two-Dimensional Equivalents of Metamaterials," IEEE Antennas and Propagation Magazine, vol. 54, No. 2, Apr. 2012, pp. 1-35.

(Continued)

*Primary Examiner* — Jessica M Merlin
(74) *Attorney, Agent, or Firm* — Shackelford, McKinley & Norton, LLP

(57) ABSTRACT

Various embodiments may relate to a tunable optical device. The tunable optical device may include a ferroelectric layer including a ferroelectric material. The tunable optical device may also include one or more first electrodes on a first side of the ferroelectric layer. The tunable optical device may further include one or more second electrodes on a second side of the ferroelectric layer opposite the first side. A refractive index of the ferroelectric material may be changeable in response to a potential difference applied between the one or more first electrodes and the one or more second (Continued)

electrodes. The one or more first electrodes and the one or more second electrodes may be configured to allow visible light or infrared light to pass through.

18 Claims, 34 Drawing Sheets

(56) References Cited

U.S. PATENT DOCUMENTS

| | | | | |
|---|---|---|---|---|
| 2006/0228089 | A1* | 10/2006 | Shimokozono | G02B 5/288 385/147 |
| 2008/0049328 | A1* | 2/2008 | Zhou | G02F 1/292 359/566 |
| 2016/0223723 | A1* | 8/2016 | Han | G02F 1/292 |
| 2018/0196138 | A1* | 7/2018 | Lee | G02F 1/21 |
| 2019/0033682 | A1* | 1/2019 | Kafaie Shirmanesh | G02F 1/29 |
| 2019/0219747 | A1 | 7/2019 | Beechem, III et al. | |
| 2020/0081316 | A1* | 3/2020 | Jeong | G02F 1/292 |
| 2020/0412005 | A1* | 12/2020 | Olk | H01Q 15/0086 |
| 2021/0302312 | A1* | 9/2021 | Shvets | G02B 21/06 |

OTHER PUBLICATIONS

Kildishev et al., "Planar Photonics with Metasurfaces," Science, vol. 339, No. 6125, Mar. 15, 2013, pp. 1-6.
Arbabi et al., "Dielectric Metasurfaces for Complete Control of Phase and Polarization with Subwavelength Spatial Resolution and High Transmission," Nature Nanotechnology, vol. 10, No. 11, Nov. 2015, pp. 937-943.
Glybovski et al., "Metasurfaces: From Microwaves to Visible," Physics Reports, vol. 634, 2016, pp. 1-72.
Shaltout et al. "Spatiotemporal Light Control with Active Metasurfaces," Science, vol. 364, No. 648, 2019, pp. 1-10.
Yang et al., "Fundamentals of Liquid Crystal Devices," John Wiley & Sons, 2014, Chapter 12, Tunable Liquid Crystal Photonic Devices, pp. 413-444.
Shirmanesh et al., "Dual-Gated Active Metasurface at 1550 nm with Width (>300 Degrees) Phase Tunability," Nano Letters, vol. 18, No. 5, 2018, pp. 2957-2963.
Kim et al., "Phase Modulation with Elecdrically Tunable Vanadium Dioxide Phase-Change Metasurfaces," Nano Letters, vol. 19, 2019, pp. 3961-3968.
Arbabi et al., "MEMS-Tunable Dielectric Metasurface Lens," Nature Communications, vol. 9, No. 1, 2018, pp. 1-9.
She et al., "Adaptive Metalenses with Simultaneous Electrical Control of Focal Length, Astigmatism, and Shift," Science Advances, vol. 4, No. 2, 2018, pp. 1-7.
Kasap et al., "Springer Handbook of Electronic and Photonic Materials," Springer Science & Business Media, 2006, Chapter 26, Ferroelectric Materials, pp. 589-614.
Hsu et al., "Orientation-Dependent Electro-Optical Response of BaTiO3 on SrTiO3-Buffered Si(001) Studied via Spectroscopic Ellipsometry," Optical Materials Express, vol. 7, No. 6, Jun. 1, 2017, pp. 2030-2039.
Kormondy et al., "Microstructure and Ferroelectricity of BaTio3 Thin Films on Si for Integrated Photonics," Nanotechnology, vol. 28, 2017, pp. 1-10.
Gorzkowski et al., "Glass-Ceramics of Barium Strontium Titanate for High Energy Density Capacitors," Journal of Electroceramics, vol. 18, 2007, pp. 269-276.
Bao et al., "Barium Strontium Titanate Thin Film Varactors for Room-Temperature Microwave Device Applications," Journal of Physics D: Applied Physics, vol. 41, No. 6, 2008, pp. 1-21.
Kosanovic et al., "Mechanical-Chemical Synthesis Ba0.77Sr0.23TiO3," Science of Sintering, vol. 44, No. 1, 2012, pp. 47-55.
Wang et al., "Electro-Optic Characterization of Epitaxial Ba0.7Sr0.3TiO3 Thin Films Using Prism Coupling Technique," Current Applied Physics, vol. 11, No. 3, 2011, pp. 552-555.
Wang et al., "Fabrication and Characterization of Epitaxial Ba0.7Sr0.3TiO3 Thin Films for Optical Waveguide Applications," Applied Optics, vol. 45, No. 9, Mar. 20, 2006, pp. 1972-1978.
Kim et al., "Electro-Optic Characteristics of (001)-Oriented Ba0.6Sr0.4TiO3 Thin Films," vol. 82, No. 9, Mar. 3, 2003, pp. 1455-1457.
Gires et al., "Interferometer Usable for Compression of Frequency-Modulated Pulses of Light," Comptes Rendus Hebdomadaires des Seances de l'Academie des Sciences, vol. 258, No. 25, 1964, pp. 6112-6115.
International Search Report for International Application No. PCT/SG2021/050005 dated Apr. 14, 2021, pp. 1-5.
Written Opinion of the International Searching Authority for International Application No. PCT/SG2021/050005 dated Apr. 14, 2021, pp. 1-4.
Huang et al., "Gate-Tunable Conducting Oxide Metasurfaces," Nano Letters, vol. 16, No. 9, Aug. 26, 2016, pp. 5319-5325.
Nemati et al., "Tunable and Reconfigurable Metasurfaces and Metadevices," Opto-Electronic Advances, vol. 1, No. 5, Jun. 29, 2018, pp. 1-25.

* cited by examiner

Δn = 0.001

Δn = 0.005

TUNABLE OPTICAL DEVICE AND METHOD OF FORMING THE SAME

CROSS-REFERENCE TO RELATED APPLICATION

This application claims the benefit of priority of Singapore application No. 10202000476R filed Jan. 17, 2020, the contents of it being hereby incorporated by reference in its entirety for all purposes.

TECHNICAL FIELD

Various embodiments of this disclosure may relate to a tunable optical device. Various embodiments of this disclosure relate may relate to a method of forming a tunable optical device.

BACKGROUND

Metasurfaces are the two-dimensional equivalents of metamaterials, including subwavelength structures called meta-atoms. They can control different properties of the light such as amplitude, phase, dispersion, momentum, and polarization. Flat optics made from metasurfaces have attracted enormous attention due to their versatile functionality, ultra-thin feature, and ease of integration compared with conventional refractive optics. Active control of light propagation in the visible and near-infrared (near-IR) spectrum has practical and fundamental significance for applications such as autonomous vehicles, robots, displays, augmented and virtual reality devices, consumer electronics, telecommunications, and sensing devices. Currently, commercially available devices include traditional microelectromechanical system (MEMS) mirrors, electrically-addressed spatial light modulators (EASLMs), and optically-addressed spatial light modulators (OASLMs).

MEMS mirrors are only applicable in reflective modes and may suffer from a short-range and small field of view. EASLMs and OASLMs use liquid crystals (LCs) as the tunable material in unit cells and may suffer from low resolution, small field of view (FOV) due to the size of the unit cell and cross-talk between the LCs in neighboring cells, as well as low speed limited by the rotation speed of LCs molecules. Active flat optics with tunable sub-wavelength structures may provide better solutions to these applications due to their ultra-compactness, much smaller unit cells and the possibility for unit cells to be controlled individually.

Various approaches have been proposed to achieve active and tunable flat optics. Phase-only transmissive spatial light modulator based on tunable dielectric including titanium oxide ($TiO_2$) nanoantennas surrounded in LCs has been proposed. Although the shrinking of the thickness and pitch of each unit cell reduces the direct current (DC) voltage required and potentially increases the FOV, the efficiency may drop to 36% in transmission mode. The LCs based tuning mechanism would also restrict the ultimate operation speed of the device.

A tunable dual-gated conducting oxide metasurface has been reported. By tuning a very thin layer of transparent conducting oxide (TCO) in a metal-insulator-metal (MIM) structure, the device is able to shift the epsilon near zero of the TCO film and consequently tune the resonance frequency of the MIM plasmonic resonator. This also resulted in an almost $2\pi$ phase change in the reflected light which could be used for beam steering. Although this technique increases the speed of the beam steering significantly compared to LCs, it suffers from low efficiency of below 20% even in the reflection mode, inherited from the lossy mechanism of MIM resonators and TCO films.

Phase change materials such as vanadium oxide ($VO_2$) have also been used to make tunable reflectarray metasurfaces. The phase change of $VO_2$ between semiconducting and semimetallic is realized through electrical micro-resistive heating. A reflectance modulation of 23.5% and spectral resonance shift have been observed. This is not an ideal solution due to low efficiency and low speed. Tunable flat lenses have also been attempted by using tunable metasurfaces through MEMS and stretchable elastomers. The mechanical tuning nature limits the speeds for these devices as well as raises the concern on robustness.

SUMMARY

Various embodiments may relate to a tunable optical device. The tunable optical device may include a ferroelectric layer including a ferroelectric material. The tunable optical device may be configured to work in optical frequency range from visible to infrared. The tunable optical device may also include one or more first electrodes on a first side of the ferroelectric layer. The tunable optical device may further include one or more second electrodes on a second side of the ferroelectric layer opposite the first side. A refractive index of the ferroelectric material may be changeable in response to a potential difference applied between the one or more first electrodes and the one or more second electrodes. The one or more first electrodes and the one or more second electrodes may be configured to allow visible light or infrared light to pass through.

Various embodiments may relate to a method of forming a tunable optical device. The method may include forming a ferroelectric layer including a ferroelectric material. The method may also include forming one or more first electrodes on a first side of the ferroelectric layer. The method may further include forming one or more second electrodes on a second side of the ferroelectric layer opposite the first side. A refractive index of the ferroelectric material may be changeable in response to a potential difference applied between the one or more first electrodes and the one or more second electrodes. The one or more first electrodes and the one or more second electrodes may be configured to allow visible light or infrared light to pass through.

BRIEF DESCRIPTION OF THE DRAWINGS

In the drawings, like reference characters generally refer to the same parts throughout the different views. The drawings are not necessarily drawn to scale, emphasis instead generally being placed upon illustrating the principles of various embodiments. In the following description, various embodiments of the invention are described with reference to the following drawings.

DESCRIPTION

The following detailed description refers to the accompanying drawings that show, by way of illustration, specific details and embodiments in which the invention may be practised. These embodiments are described in sufficient detail to enable those skilled in the art to practise the invention. Other embodiments may be utilized and structural, logical, and electrical changes may be made without departing from the scope of the invention. The various embodiments are not necessarily mutually exclusive, as some embodiments can be combined with one or more other embodiments to form new embodiments.

Embodiments described in the context of one of the tunable optical devices or methods are analogously valid for the other tunable optical devices or methods. Similarly, embodiments described in the context of a method are analogously valid for a tunable optical device, and vice versa.

Features that are described in the context of an embodiment may correspondingly be applicable to the same or similar features in the other embodiments. Features that are described in the context of an embodiment may correspondingly be applicable to the other embodiments, even if not explicitly described in these other embodiments. Furthermore, additions and/or combinations and/or alternatives as described for a feature in the context of an embodiment may correspondingly be applicable to the same or similar feature in the other embodiments.

The member or assembly as described herein may be operable in various orientations, and thus it should be understood that the terms "top", "bottom", etc., when used in the following description are used for convenience and to aid understanding of relative positions or directions, and not intended to limit the orientation of the tunable optical device.

In the context of various embodiments, the articles "a", "an" and "the" as used with regard to a feature or element include a reference to one or more of the features or elements.

In the context of various embodiments, the term "about" or "approximately" as applied to a numeric value encompasses the exact value and a reasonable variance.

As used herein, the term "and/or" includes any and all combinations of one or more of the associated listed items.

Various embodiments may seek to address the issues facing one or more conventional devices.

Figure 1:
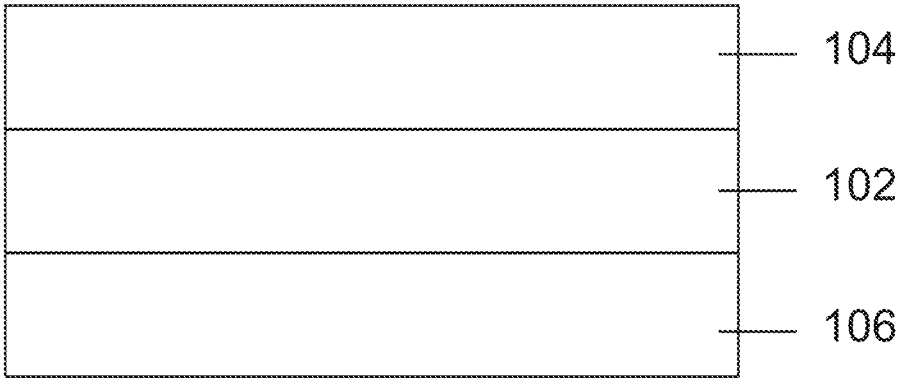
FIG. 1 is a general illustration of a tunable optical device according to various embodiments.

FIG. 1 is a general illustration of a tunable optical device according to various embodiments. The tunable optical device may include a ferroelectric layer 102 (alternatively referred to as a ferroelectric film) including a ferroelectric material. The tunable optical device may also include one or more first electrodes 104 on a first side of the ferroelectric layer. The tunable optical device may further include one or more second electrodes 106 on a second side of the ferroelectric layer opposite the first side. The tunable optical device may be configured to work in the optical frequency range from visible to infrared. A refractive index of the ferroelectric material may be changeable in response to a potential difference applied between the one or more first electrodes 104 and the one or more second electrodes 106. The one or more first electrodes and the one or more second electrodes may be configured to allow visible light or infrared light to pass through.

In other words, the tunable optical device may include a ferroelectric layer 102, one or more first electrodes 104, and one or more second electrodes 106 such that the ferroelectric layer 102 is between the one or more first electrodes 104 and the one or more second electrodes 106. The refractive index of the ferroelectric material may vary based on a potential difference applied between the one or more first electrodes 104 and the one or more second electrodes 106. The one or more first electrodes 104 and the one or more second electrodes 106 may be transparent to visible or infrared light.

For avoidance of doubt, FIG. 1 merely seeks to illustrates some features according to certain embodiments, and does not limit the relative size, shapes, orientation etc. of these features. For instance, while FIG. 1 shows that the ferroelectric layer 102, the first electrode 104, and the second electrode 106 have the same cross-sectional or surface area, in various embodiments, the cross-sectional or surface area of the first electrode 104, and the second electrode 106 may be different. While FIG. 1 shows one continuous first electrode 104 and one continuous second electrode 106, various embodiments may include a plurality of first electrodes 104 and/or second electrodes 106.

In various embodiments, the one or more first electrodes 104 may be top electrodes, and the one or more second electrodes 106 may be bottom electrodes.

In various embodiments, the ferroelectric material may be any suitable ferroelectric material. For instance, the ferroelectric material may be, but may not be limited to barium strontium titanate (BST), barium titanate (BTO), lead lanthanum zirconate titanate (PLZT), lithium niobate ($LiNbO_3$), or potassium tantalate niobate (KTN).

In various embodiments, the one or more first electrodes 104 may allow at least a substantial amount of visible light or infrared light to pass through. For instance, the one or more first electrodes 104 may include a suitable material that allows at least 70%, 75%, 80%, 85%, 90%, 95%, or 99% of the incident visible light or infrared light to pass through. Likewise, the one or more second electrodes 106 may allow at least a substantial amount of visible light or infrared light to pass through. For instance, the one or more second electrodes 106 may include a suitable material that allows at least 70%, 75%, 80%, 85%, 90%, 95%, or 99% of the incident visible light or infrared light to pass through.

In various embodiments, the one or more first electrodes 104 and the one or more second electrodes 106 may be of or may include the same material. In various other embodiments, the one or more first electrodes 104 may include a first material, while the one or more second electrodes 106 may include a second material different from the first material. Various embodiments may include a plurality of first electrodes 104. The plurality of first electrodes 104 may be of the same material or of different materials. The plurality of second electrodes 106 may be of the same material or of different materials. The material(s) may be transparent conductive oxide(s) and/or any other suitable materials. For instance, the one or more first electrodes and the one or more second electrodes may include a material selected from a group consisting of indium tin oxide (ITO), fluorine doped tin oxide (FTO), aluminium zinc oxide (AZO), barium titanate (BTO), strontium vanadate ($SrVO_3$), calcium vanadate ($CaV_2O_6$), carbon nanotubes, and graphene. In various embodiments, the one or more first electrodes may be ITO layers or films, while the one or more second electrodes may be ITO layers or films.

In various embodiments, the tunable optical device may include a distributed Bragg reflector (DBR). The one or more second electrodes 106 may be over or on the distributed Bragg reflector (DBR). The distributed Bragg reflector may include alternating layers of materials having different refractive indexes.

In various embodiments, the tunable optical device may further include a further distributed Bragg reflector (DBR) such that the ferroelectric layer, the one or more first electrodes and the one or more second electrodes are between the distributed Bragg reflector (DBR) and the further distributed Bragg reflector (DBR). The further distributed Bragg reflector may include alternating layers of materials having different refractive indexes.

The distributed Bragg reflector and/or the further distributed Bragg reflector may for instance include alternating layers of silicon oxide ($SiO_2$) and titanium oxide ($TiO_2$).

Other examples may, for instance include alternating layers of silicon oxide ($SiO_2$) and silicon nitride (SiN), or alternating layers of silicon (Si) and silicon nitride (SiN), or alternating layers of silicon (Si) and silicon oxide ($SiO_2$), or alternating layers of indium aluminium phosphide (InAlP) and indium gallium aluminium phosphide (InGaAlP), or alternating layers of indium aluminium phosphide (InAlP) and gallium arsenide (GaAs).

In various embodiments, the tunable optical device may include a substrate. The one or more second electrodes 106 may be on or over the substrate. The substrate may include any suitable material, including, but is not limited to magnesium oxide (MgO), sapphire ($Al_2O_3$), lanthanum aluminate—strontium aluminium tantalate (LSAT), strontium titanate (STO), magnesium fluoride ($MgF_2$), silicon, or quartz ($SiO_2$).

In various embodiments, the tunable optical device may include a broadband metallic mirror. The one or more second electrodes 106 may be on or over the broadband metallic mirror. The broadband metallic mirror may include, for instance aluminium, silver or gold.

In various other embodiments, the ferroelectric layer 102, the one or more first electrodes 104, and the one or more second electrodes 106 may be or may form a standalone structure.

In various embodiments, the one or more first electrodes 104 may be or may include a plurality of sub-wavelength structures forming a metasurface. A sub-wavelength structure may be a structure having its length or width smaller than a wavelength of the light (e.g. visible light or infrared light) in which the tunable optical device is used in conjunction with. In various embodiments, the plurality of sub-wavelength structures may be nanostructures. A nanostructure may be a structure having a dimension equal to or less than 100 nm.

In various embodiments, the tunable optical device may additionally include a plurality of contacts located at corner regions of a circumscribed polygon. In other words, the contacts may be within a polygon when viewed from the top, but outside a circle inscribed within the polygon. The plurality of contacts may be electrically coupled or connected to the one or more first electrodes. The polygon may for instance be a square.

In various embodiments, the tunable optical device may be a modulator. In various other embodiments, the tunable optical device may be a tunable filter, a tunable flat lens. a beam sweeper, or a light router. In various embodiments, the tunable optical device may be a tunable flat optics used for beam steering and/or shaping. In other words, the tunable optical device may be any one selected from a group consisting of a modulator, a tunable filter, a beam sweeper, a beam steering device, a tunable lens and a light router.

In various embodiments, the optical device may operate in the reflection mode or in the transmission mode.

In various embodiments, the optical device may be or may include a Gires-Tournois etalon (GTE).

Figure 2:
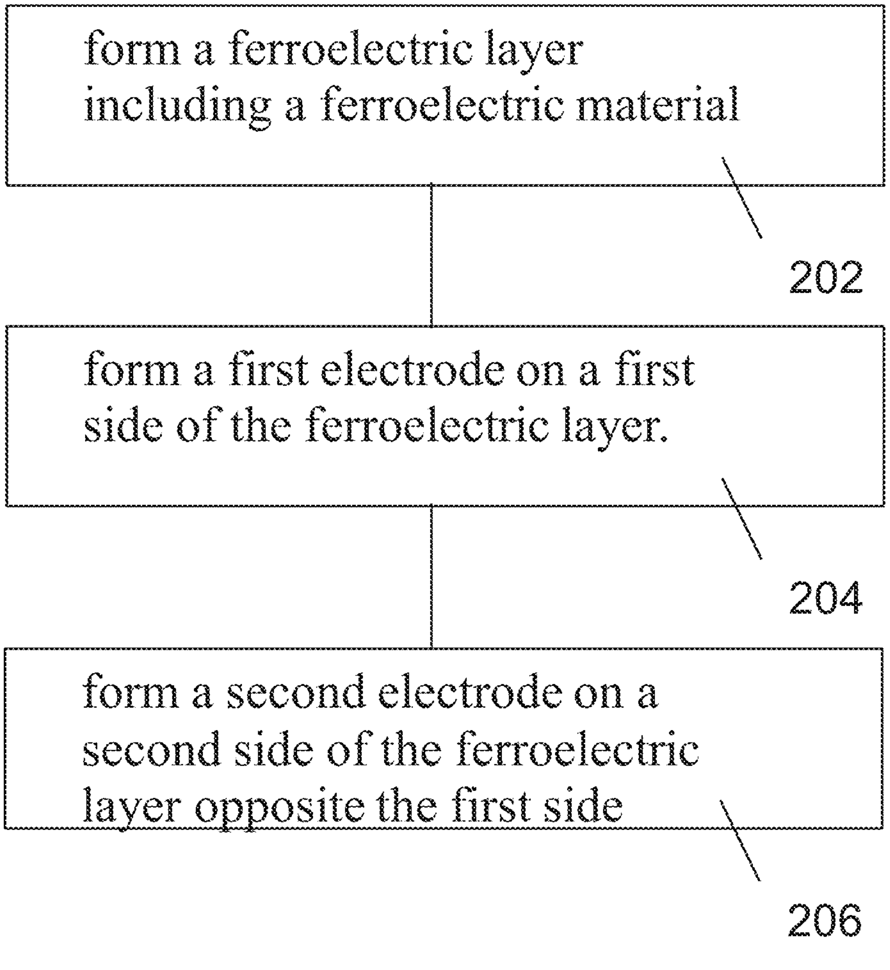
FIG. 2 is a general illustration of a method of forming a tunable optical device according to various embodiments.

FIG. 2 is a general illustration of a method of forming a tunable optical device according to various embodiments. The method may include, in 202, forming a ferroelectric layer including a ferroelectric material. The method may also include, in 204, forming one or more first electrodes on a first side of the ferroelectric layer. The method may further include, in 206, forming one or more second electrodes on a second side of the ferroelectric layer opposite the first side. A refractive index of the ferroelectric material may be changeable in response to a potential difference applied between the one or more first electrodes and the one or more second electrodes. The one or more first electrodes and the one or more second electrodes may be configured to allow visible light or infrared light to pass through.

In other words, the method may include forming a ferroelectric layer, one or more first electrodes and one or more second electrodes.

For avoidance of doubt, FIG. 2 is not intended to limit the sequence of the various steps. In various embodiments, the one or more second electrodes may be formed first, followed by forming the ferroelectric layer and the one or more first electrodes. In various embodiments, one or more layers may be formed at the same time.

In various embodiments, the ferroelectric material may be any suitable ferroelectric material. For instance, the ferroelectric material may be, but may not be limited to barium strontium titanate (BST), barium titanate (BTO), lead lanthanum zirconate titanate (PLZT), lithium niobate ($LiNbO_3$), or potassium tantalate niobate (KTN).

In various embodiments, the one or more first electrodes and the one or more second electrodes may be of or may include the same material. In various other embodiments, the one or more first electrodes and the one or more second electrodes may be of or may include different materials. The material(s) may be transparent conductive oxide(s) and/or any other suitable materials. For instance, the one or more first electrodes and the one or more second electrodes may include a material selected from a group consisting of indium tin oxide (ITO), fluorine doped tin oxide (FTO), aluminium zinc oxide (AZO), barium titanate (BTO), strontium vanadate ($SrVO_3$), calcium vanadate ($CaV_2O_6$), carbon nanotubes, and graphene.

In various embodiments, the method may also include forming a distributed Bragg reflector (DBR). The one or more second electrodes 106 may be over or on the distributed Bragg reflector (DBR). The distributed Bragg reflector may include alternating layers of materials having different refractive indexes.

In various embodiments, the method may also include forming a further distributed Bragg reflector (DBR) such that the ferroelectric layer, the one or more first electrodes and the one or more second electrodes are between the distributed Bragg reflector (DBR) and the further distributed Bragg reflector (DBR). The further distributed Bragg reflector may include alternating layers of materials having different refractive indexes.

In various embodiments, the tunable optical device may include a substrate. The one or more second electrodes may be on or over the substrate. The substrate may include any suitable material, including, but is not limited to magnesium oxide (MgO), sapphire ($Al_2O_3$), lanthanum aluminate—strontium aluminium tantalate (LSAT), strontium titanate (STO), magnesium fluoride ($MgF_2$), silicon, or quartz ($SiO_2$).

In various embodiments, the tunable optical device may include a broadband metallic mirror. The one or more second electrodes may be on or over the broadband metallic mirror.

In various other embodiments, the ferroelectric layer, the one or more first electrodes, and the one or more second electrodes may be or may form a standalone structure.

In various embodiments, the one or more first electrodes may include a plurality of sub-wavelength structures forming a metasurface.

In various embodiments, the method may also include forming a plurality of contacts located at corner regions of a circumscribed polygon.

In various embodiments, the tunable optical device may be a modulator. In various other embodiments, the tunable optical device may be a tunable filter, a tunable flat lens. a beam sweeper, or a light router. In various embodiments, the tunable optical device may be a tunable flat optics used for beam steering and/or shaping. In other words, the tunable optical device may be any one selected from a group consisting of a modulator, a tunable filter, a beam sweeper, a beam steering device, a tunable lens and a light router.

Due to the lack of center of symmetry in the crystal structure of ferroelectric materials, their electric polarization can be reversed by the application of an external electric field. The crystal structure of these materials undergoes a phase transition at Curie temperature (TC). When operating above TC, we can get high tunability and linear control of the relative permittivity under the applied electric field.

The change in the permittivity in the visible spectrum is defined by the electro-optical (EO) coefficient of the material. The linear electro-optical (EO) effect, also known as the Pockels effect, in a ferroelectric material is shown with the Pockels tensors. The change in the refractive indices of a non-centrosymmetric crystal produced by an arbitrary electric field is:

$$\Delta\left(\frac{1}{n^2}\right)_i = \sum_j r_{ij}E_j \quad \begin{matrix} i = 1, \ldots, 6 \\ j = x, y, z = 1, 2, 3 \end{matrix} \tag{1}$$

wherein $r_{ij}$ is the ijth element of the linear electro-optic tensor in contracted notation, and $E_j$ is the electric field. For example, the Pockels tensor of barium strontium titanate ($BaTiO_3$ or BTO), a uniaxial perovskite crystal, has the following form:

$$\begin{pmatrix} 0 & 0 & r_{13} \\ 0 & 0 & r_{13} \\ 0 & 0 & r_{33} \\ 0 & r_{51} & 0 \\ r_{51} & 0 & 0 \\ 0 & 0 & 0 \end{pmatrix} \tag{2}$$

where $r_{13}$, $r_{33}$, and $r_{51}$ for barium titanate (BTO) bulk crystal have been reported as 8 pm/V, 105 pm/V, and 1300 pm/V, respectively.

However, the values for epitaxial thin films reported are usually much lower such as $r_{eff}$=140 pm/V. For a BTO film with C-axis along the x-axis (parallel to the film surface, $n_z=n_y=n_o$, $n_x=n_e$) and electric field perpendicular to the film surface ($E_x=E_y=0$, $E_z\neq 0$):

$$\frac{x^2}{n_e^2} + \frac{y^2}{n_o^2} + \frac{z^2}{n_o^2} + 2r_{51}E_z xz = 1 \tag{3}$$

After finding the angle of transformation for the ellipsoid axes, one can find the new set of refractive indices:

$$\begin{cases} n'_x = n_e + \frac{n_e^3}{2} r_{51}E_z\tan\varphi \\ n'_y = n_o \\ n'_z = n_o - \frac{n_o^3}{2} r_{51}E_z\tan\varphi \end{cases} \tag{4}$$

-continued where $$\tan\varphi = \frac{1}{2r_{51}E_z}\left(\frac{1}{n_e^2} - \frac{1}{n_o^2} - \sqrt{\left(\frac{1}{n_o^2} - \frac{1}{n_e^2}\right) + 4r_{51}^2E_z^2}\right) \tag{5}$$

As a result, the value of $r_{51}$ may be taken advantage of. Barium strontium titanate ($Ba_{1-x}Sr_xTiO_3$ or BST), a solid solution of BTO and strontium titanate ($SrTiO_3$ or STO), is traditionally considered as a superior microwave dielectric material for application in wireless communication. BST thin film has a large EO coefficient and low loss in the visible spectrum. Further, the electrical and optical properties of the BST can be controlled by changing the ratio of Ba and Sr in the crystal. The Curie temperature of BTO is 120° C. meaning it is in the ferroelectric phase at room temperature (tetragonal 4 mm crystal symmetry class) while STO is a paraelectric material at room temperature. If the content of Ba is smaller than 0.7 (x>0.3), BST would be at the desired paraelectric phase at room temperature.

Figure 3:
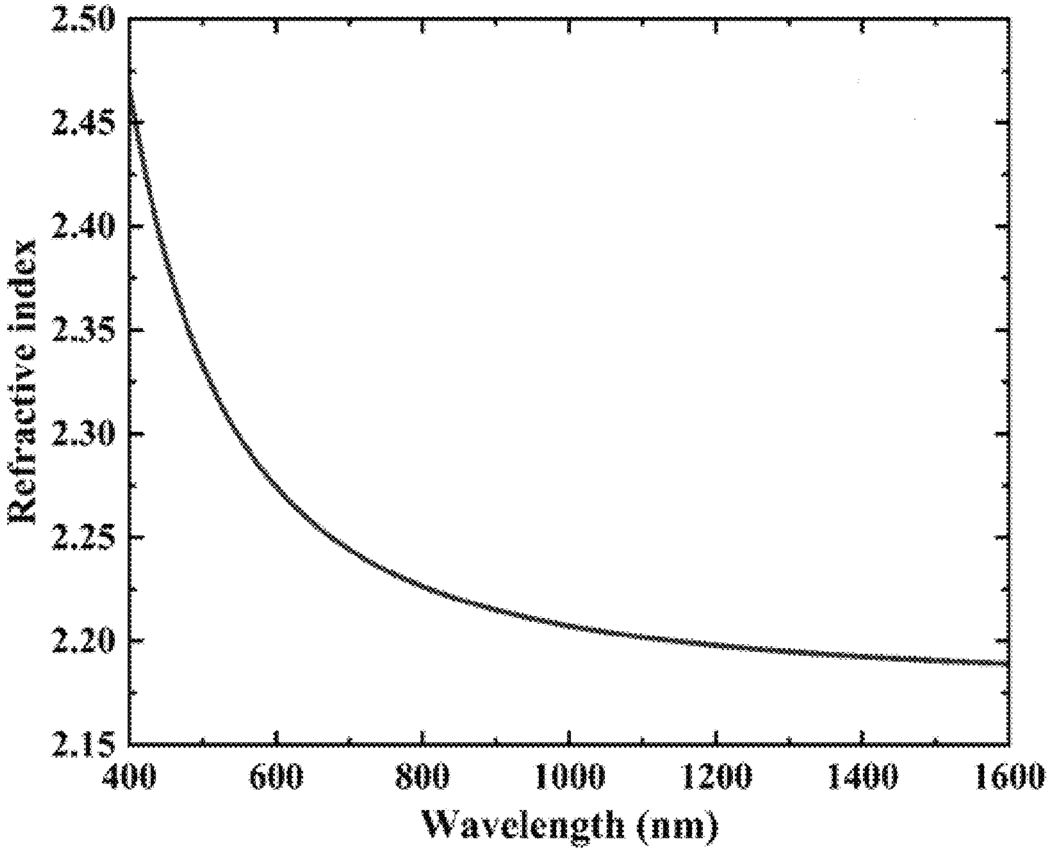
FIG. 3 is a plot of refractive index as a function of wavelength (in nanometers or nm) illustrating the refractive index of a barium strontium titanate (BST) film at different wavelengths as measured by ellipsometry according to various embodiments.

The linear electro-optic coefficient of about 780 pm/V was measured in 360 nm thick $Ba_{0.7}Sr_{0.3}TiO_3$ film on MgO substrate showing $\Delta n=5\times 10^{-2}$ at 11 V/μm (D. Wang, S. Li, H. Chan, and C. Choy, "Electro-optic characterization of epitaxial Ba $_{0.7}$ Sr $_{0.3}$ TiO $_3$ thin films using prism coupling technique," *Current Applied Physics*, vol. 11, no. 3, pp. S52-S55, 2011). A quadratic EO coefficient of $6.64\times 10^{-18}$ $m^2/V^2$ was also found in the $Ba_{0.7}Sr_{0.3}TiO_3$ thin films (620 nm thick) showing $\Delta n=5\times 10^{-3}$ at 11 V/μm (D.-Y. Wang, H. L. W. Chan, and C. L. Choy, "Fabrication and characterization of epitaxial Ba $_{0.7}$ Sr $_{0.3}$ TiO $_3$ thin films for optical waveguide applications," Applied optics, vol. 45, no. 9, pp. 1972-1978, 2006). The quadratic electro-optic coefficient of $1\times 10^{-14}$ $m^2/V^2$ has been also reported in $Ba_{0.6}Sr_{0.4}TiO_3$ thin films grown on MgO substrate resulting in birefringence variation as large as $9\times 10^{-2}$ at 4 V/μm (D.-Y. Kim, S. E. Moon, E.-K. Kim, S.-J. Lee, J.-J. Choi, and H.-E. Kim, "Electro-optic characteristics of (001)-oriented Ba $_{0.6}$ Sr $_{0.4}$ TiO $_3$ thin films," *Applied physics letters*, vol. 82, no. 9, pp. 1455-1457, 2003), which is linearly related to the change in the refractive index. As a result, BST is a very promising candidate as the active material for electrically tunable metasurface and flat optics in the visible to infrared spectrum. In the following simulations, $\Delta n=5\times 10^{-2}$ is considered as the possible refractive index change in the BST film. The BST films have been deposited by RF sputtering technique and their refractive index has been measured using spectroscopic ellipsometry. FIG. 3 is a plot of refractive index as a function of wavelength (in nanometers or nm) illustrating the refractive index of a barium strontium titanate (BST) film at different wavelengths as measured by ellipsometry according to various embodiments.

Figure 4:
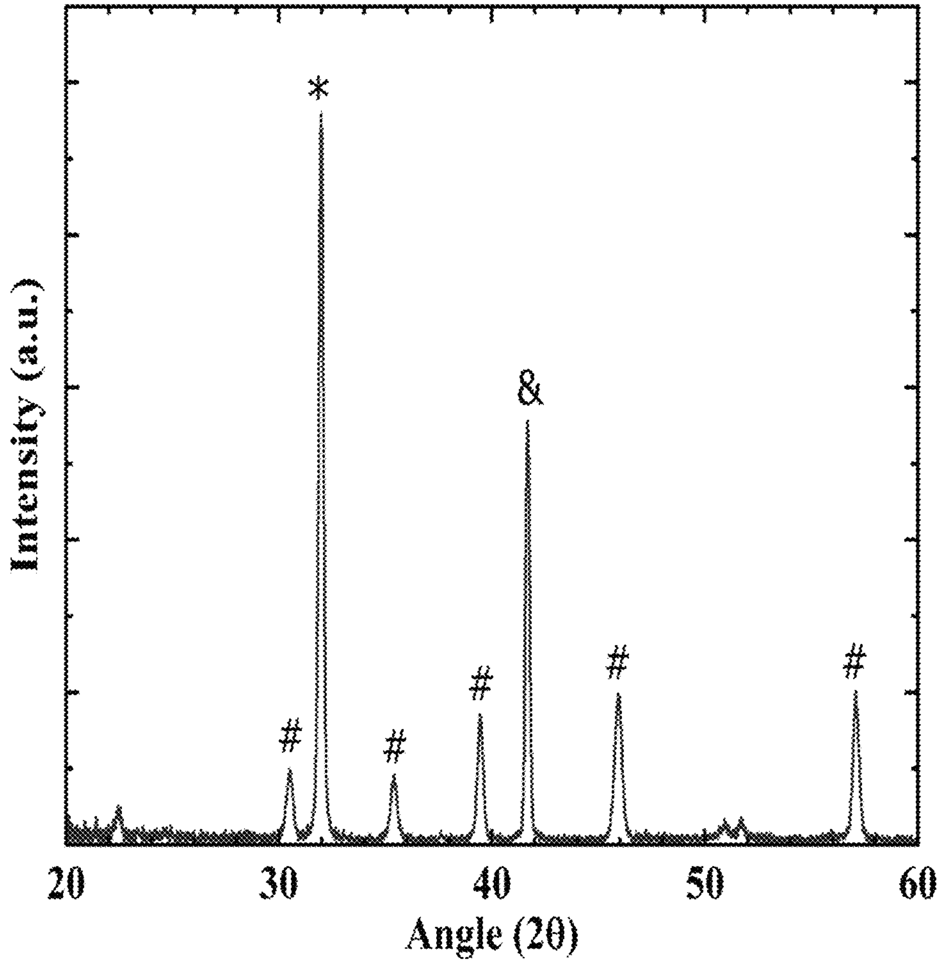
FIG. 4 is a plot of intensity (in arbitrary units or a.u.) as a function of angle (2θ) showing the X-ray diffraction (XRD) of the deposited barium strontium titanate (BST) film according to various embodiments.

The composition and crystal structure of the film is determined by X-ray diffraction (XRD) measurements. FIG. 4 is a plot of intensity (in arbitrary units or a.u.) as a function of angle (2θ) showing the X-ray diffraction (XRD) of the deposited barium strontium titanate (BST) film according to various embodiments. The peak (*) relates to BST film, the peak (#) relates to indium tin oxide (ITO) film, and the peak (&) relates to the sapphire substrate.

As shown in FIG. 4, the film has good crystallinity with a composition of $Ba_{0.5}Sr_{0.5}TiO_3$ and a cubic lattice constant of 3.947 Å corresponding to crystal orientation along 110 direction.

Figure 5:
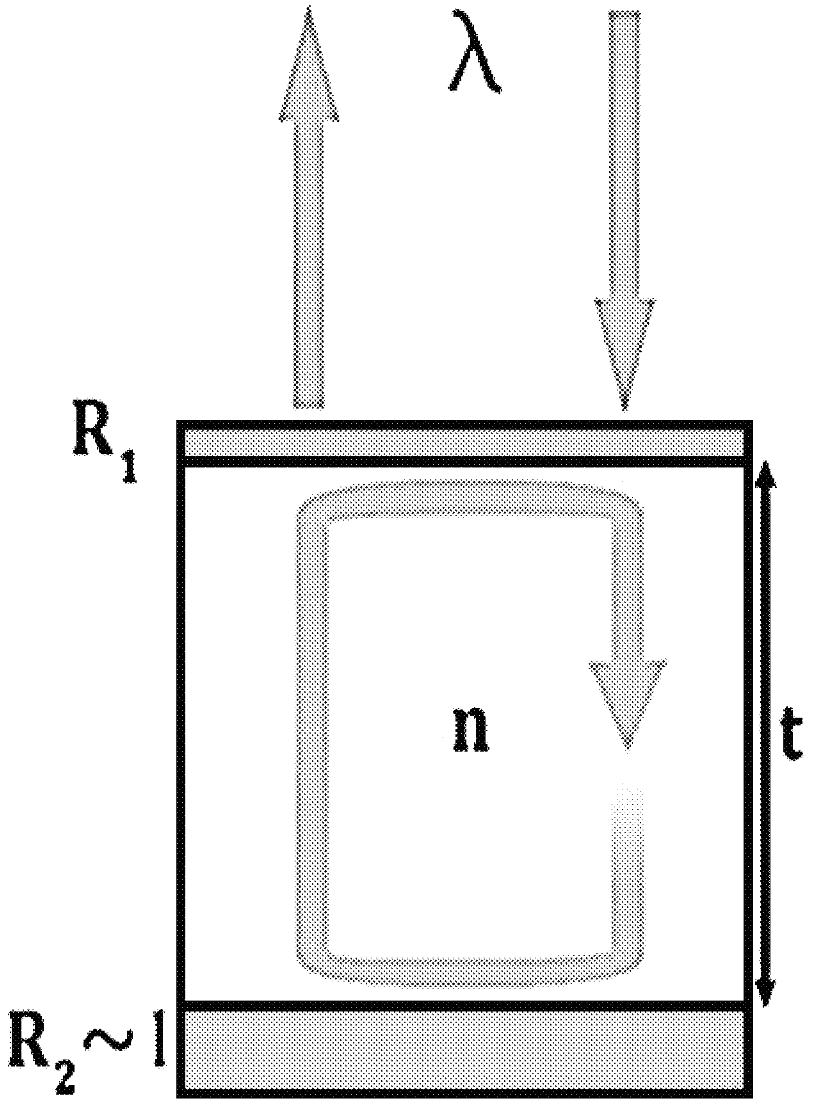
FIG. 5 is a schematic illustrating a Gires-Tournois Etalon (GTE) according to various embodiments.

FIG. 5 is a schematic illustrating a Gires-Tournois Etalon (GTE) according to various embodiments. The light impinging at normal incidence may experience an effective phase shift due to multiple-beam interference.

The GTE as shown in FIG. 5 has different reflection coefficients for its two mirrors, which make it suitable for phase modulation of the reflected light.

The complex amplitude reflectivity of a GTE is given by:

$$R = -\frac{R_1 - e^{-i\delta}}{1 - R_1 e^{-i\delta}} \tag{6}$$

where $R_1$ is the complex amplitude reflectivity of the first surface. Further, $$\delta = \frac{4\pi}{\lambda} nt\cos\theta_t \tag{7}$$

where n is the index of refraction of the plate, t is the thickness of the plate, $\theta_t$ is the angle of refraction the light makes within the plate, and λ is the wavelength of the light in vacuum.

If the wavelength of the light is near a resonance condition with the resonator, the reflected light conserves its intensity while experiencing an optical phase shift sensitive to the change of cavity length. If the reflectivity of the top/first mirror is $R_1$, then the optical phase of the reflected light can be expressed by the following equation:

$$\Phi = -2\tan^{-1}\left(\frac{1+\sqrt{R_1}}{1-\sqrt{R_1}}\tan(\Delta\phi)\right) \tag{8}$$

Δϕ is the deviation of the optical length of the spacer (in the unit of radian) from a resonance condition, i.e., an integer multiple of λ/2. In the thin ferroelectric interferometer devices with the GTE configuration, Δϕ is tunable and may reach 2π by the combined effect of the field-induced index change multiplying with $(1+\sqrt{R})/(1-\sqrt{R})$.

Figure 6:
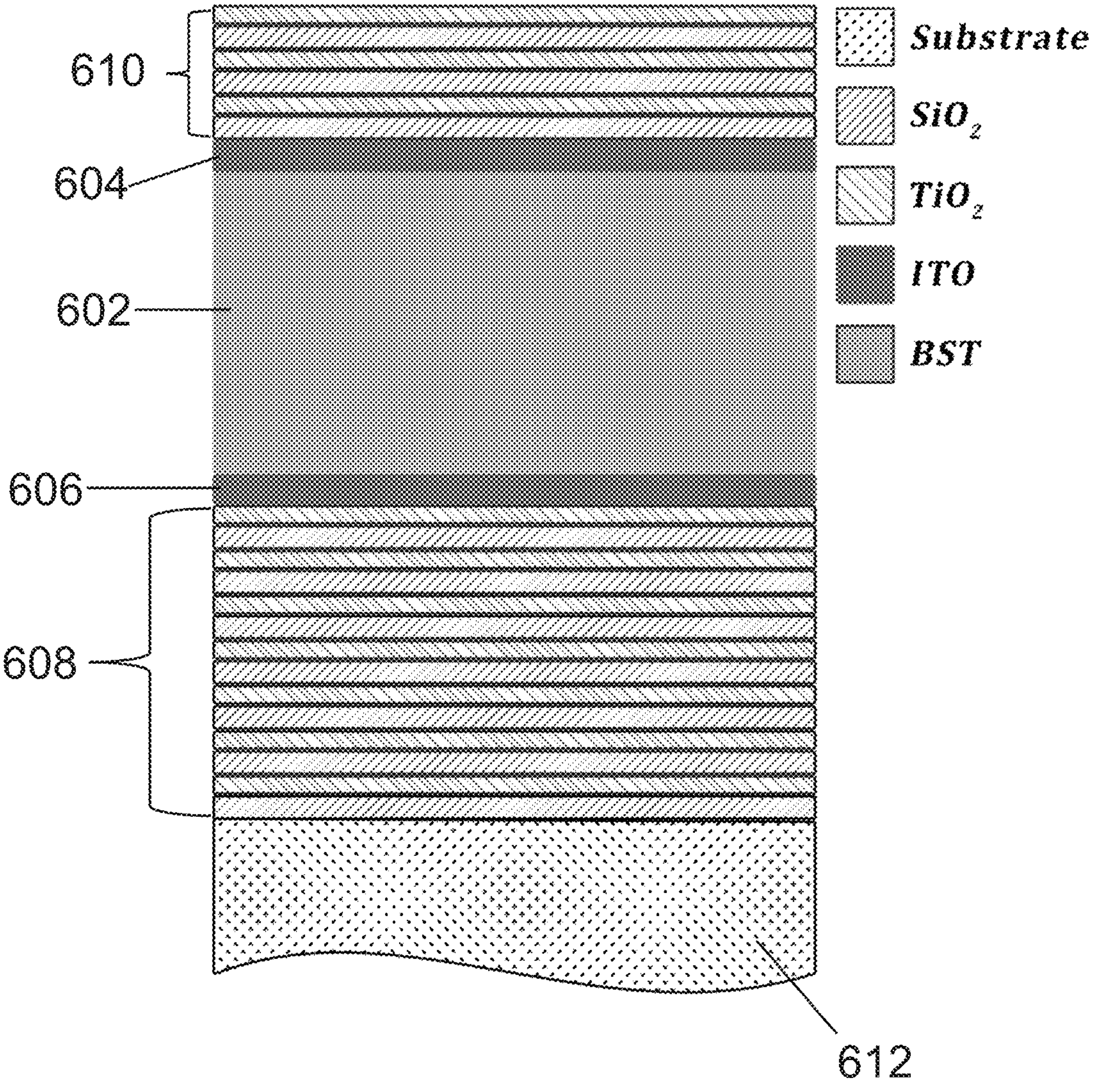
FIG. 6 is a schematic showing a Gires-Tournois etalon (GTE) device according to various embodiments.

FIG. 6 is a schematic showing a Gires-Tournois etalon (GTE) device according to various embodiments. The device may include a ferroelectric layer 602 including a ferroelectric material such as BST, as well as a first electrode 604 and a second electrode 606 including a material such as ITO. The ferroelectric layer 602 may be sandwiched by the electrodes 604, 606. The bottom electrode 606 may be 30 nm thick, while the top electrode 604 may be 5 nm thick. The device may further include a bottom DBR 608 used as a bottom mirror. The bottom DBR 608 may be constructed with 10 layers ($N_B$=10) of $TiO_2/SiO_2$ films. The operational frequency of the device and center frequency of the DBR mirror 608 may be chosen to correspond to wavelength, λ=633 nm. A similar DBR 610 may be designed as a top mirror with 3 layers of $TiO_2/SiO_2$ films ($N_T$=3). The thickness of the BST film 602 ($t_b$) may be chosen to be 1950 nm. The amplitude and phase of the reflected light (λ=633 nm) are simulated using finite-difference time-domain (FDTD) simulations. The DBR 608 may be on a substrate 612.

Figure 7:
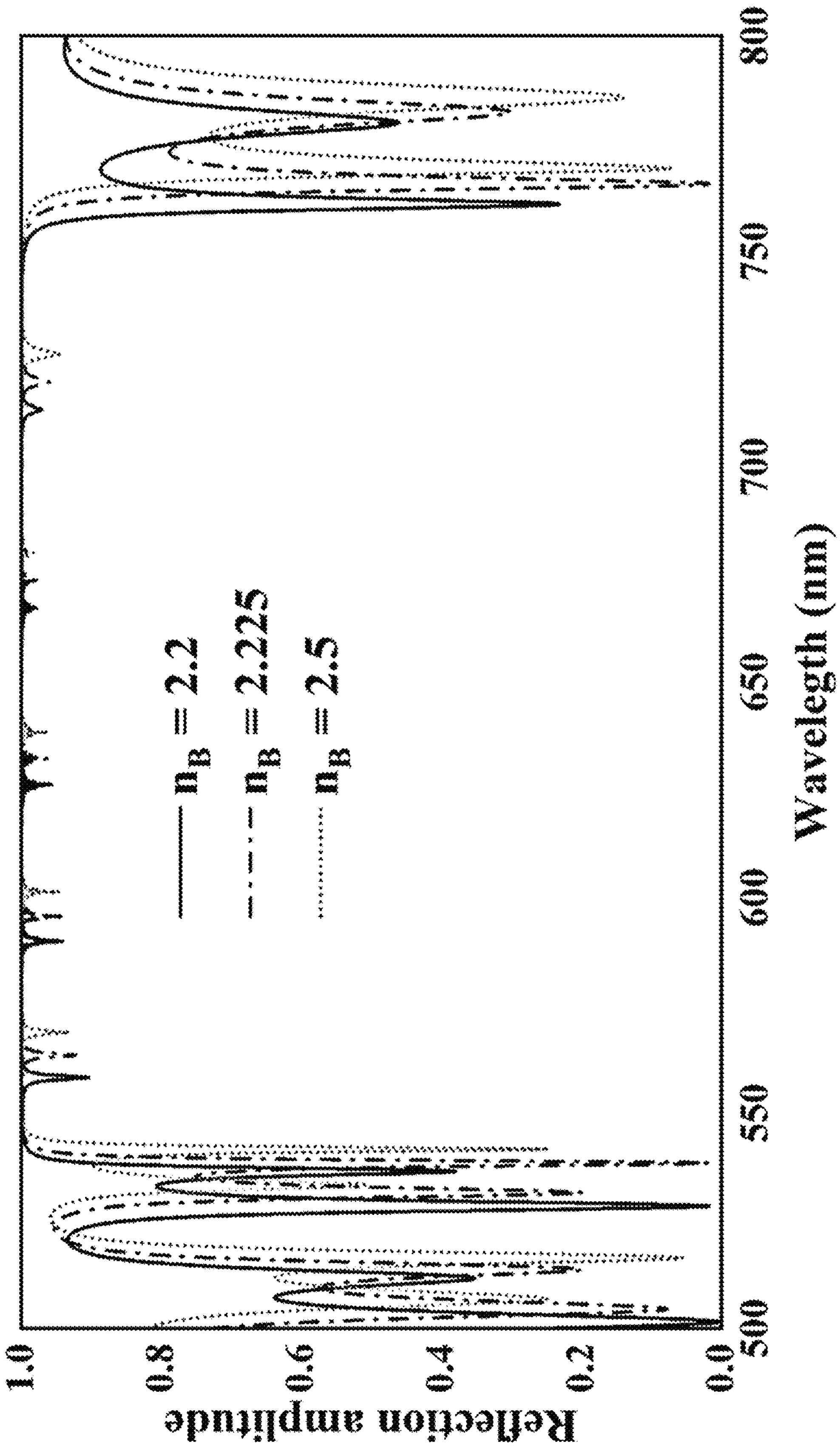
FIG. 7 shows a plot of reflection as a function of wavelength (in nanometers or nm) illustrating the reflection spectrum of the tunable Gires-Tournois etalon (GTE) device shown in FIG. 6 with barium strontium titanate (BST) of varying refractive indexes according to various embodiments.

The reflection spectrum of the GTE is shown in FIG. 7 as the refractive index of the BST is changed. FIG. 7 shows a plot of reflection as a function of wavelength (in nanometers or nm) illustrating the reflection spectrum of the tunable Gires-Tournois etalon (GTE) device shown in FIG. 6 with barium strontium titanate (BST) of varying refractive indexes according to various embodiments.

Figure 8:
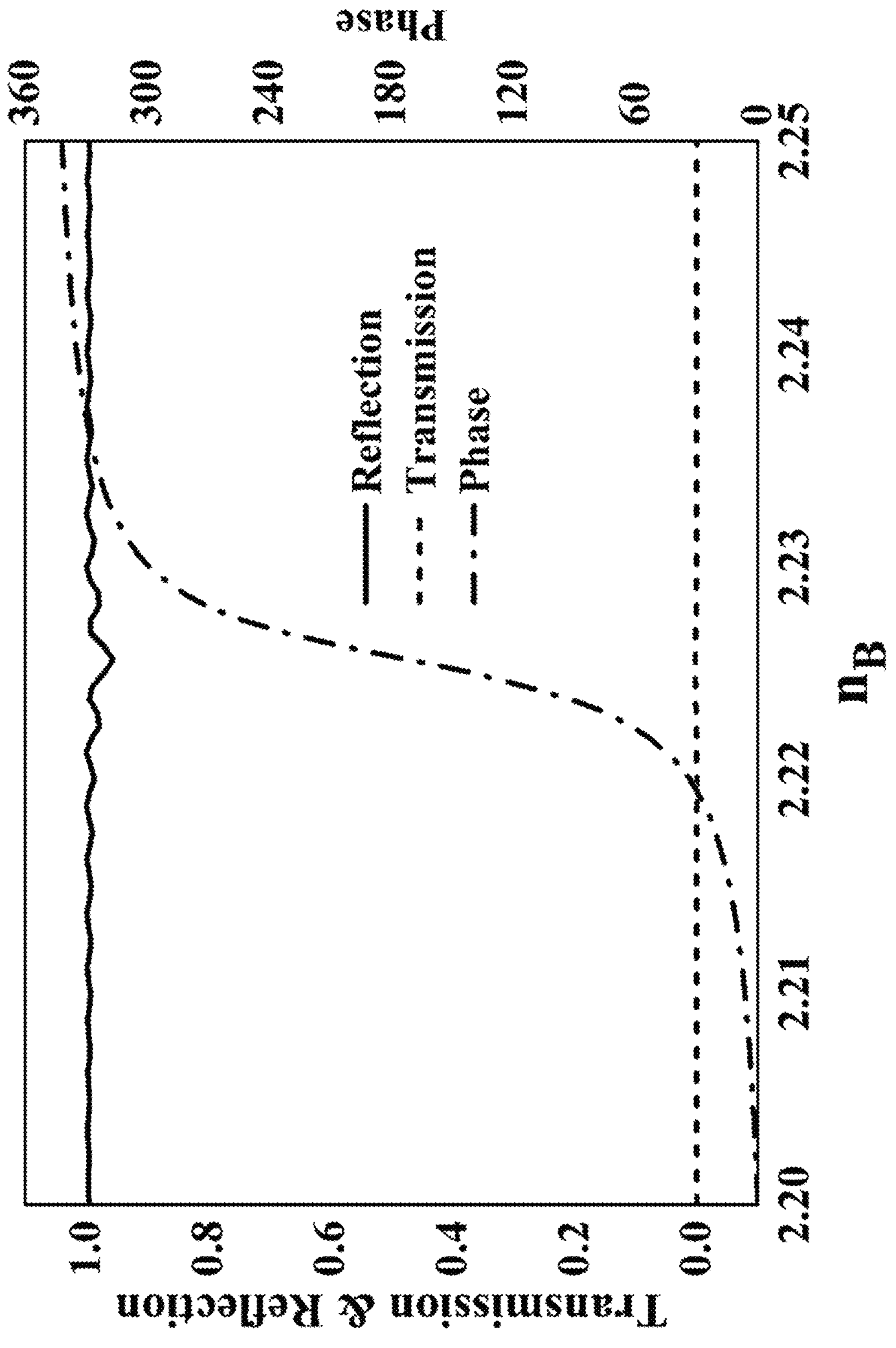
FIG. 8 is a plot of transmission and reflection/phase as a function of refractive index ($n_B$) illustrating the variation of reflection, transmission amplitude and reflection phase with refractive index of the tunable Gires-Tournois etalon (GTE) device shown in FIG. 6 according to various embodiments.

The transmission and reflection coefficient, as well as the phase of reflected light versus the refractive index, are shown in FIG. 8. FIG. 8 is a plot of transmission and reflection/phase as a function of refractive index ($n_B$) illustrating the variation of reflection, transmission amplitude and reflection phase with refractive index of the tunable Gires-Tournois etalon (GTE) device shown in FIG. 6 according to various embodiments. As seen from FIG. 8, the reflected light has 300 degrees of phase change.

Figure 9:
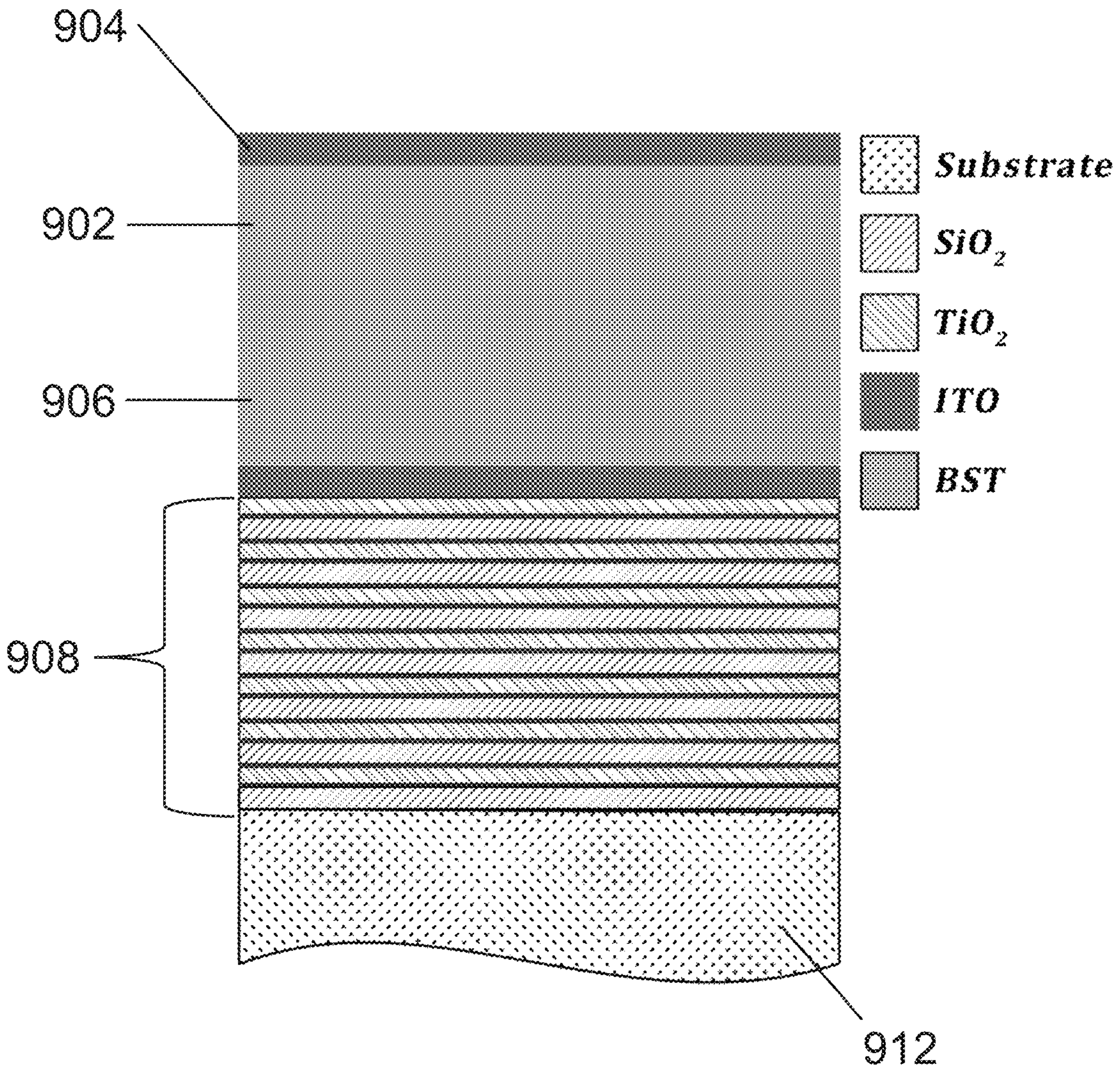
FIG. 9 is a schematic showing a Gires-Tournois etalon (GTE) device according to various other embodiments.

In order to circumvent the complexity involving the top DBR in a GTE, the top DBR may be removed as shown in FIG. 9. FIG. 9 is a schematic showing a Gires-Tournois etalon (GTE) device according to various other embodiments. The device may include a ferroelectric layer 902 including a ferroelectric material such as BST, as well as a first electrode 904 and a second electrode 906 including a material such as ITO. The second electrode 906 may be on a DBR 908, and the DBR 908 may be on a substrate 912.

The thickness of the BST film 902 may be increased to $t_b$=3890 nm to achieve ~300 degrees of phase change in the reflected light.

Figure 10A:
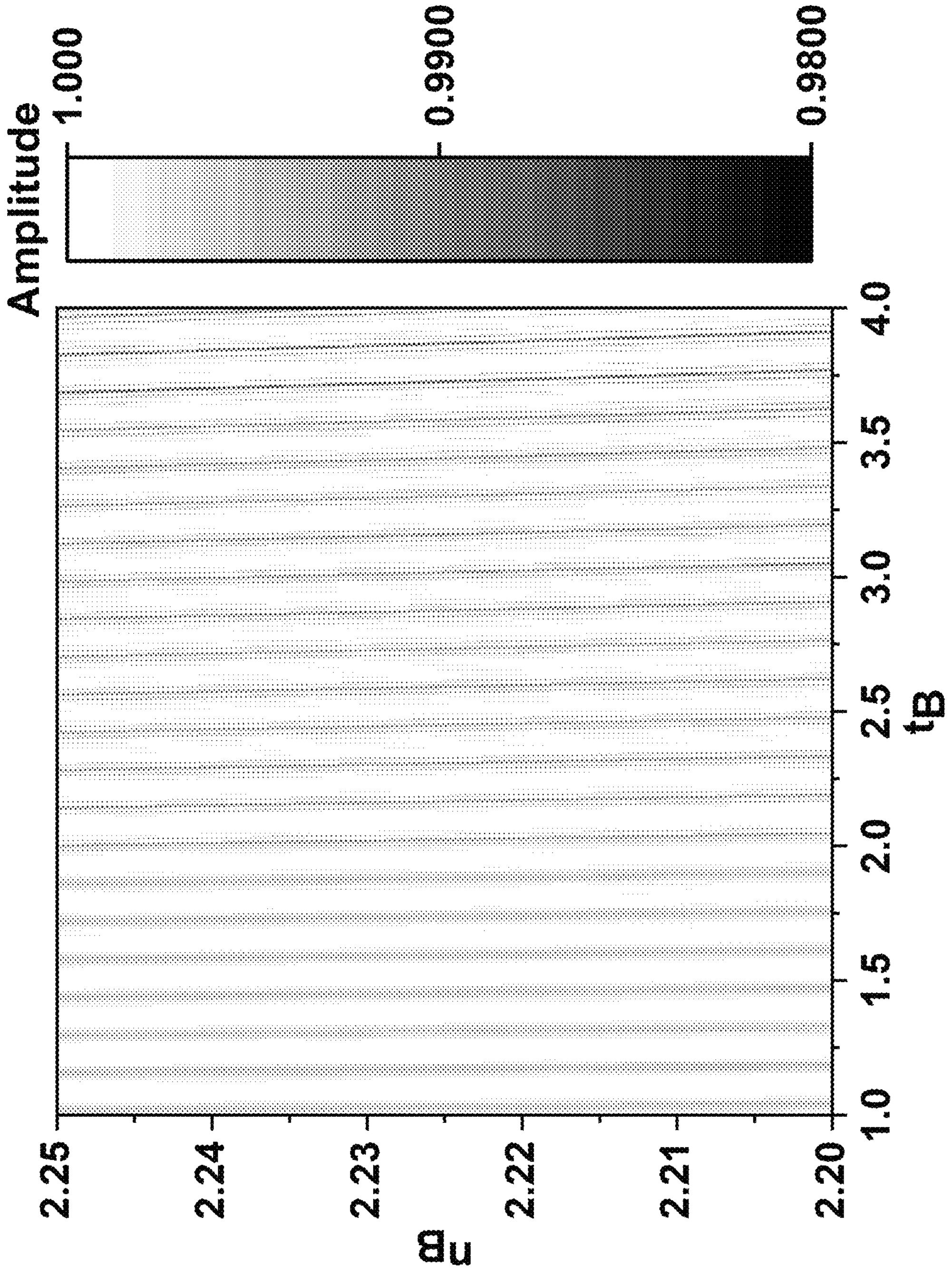
FIG. 10A shows a plot of refractive index ($n_B$) as a function of film thickness ($t_B$) showing variation of the amplitude of the reflected light at wavelength (λ) of 633 nm as the thickness of the barium strontium titanate (BST) film in the device shown in FIG. 9 is changed from 1 μm to 4 μm according to various embodiments.
Figure 10B:
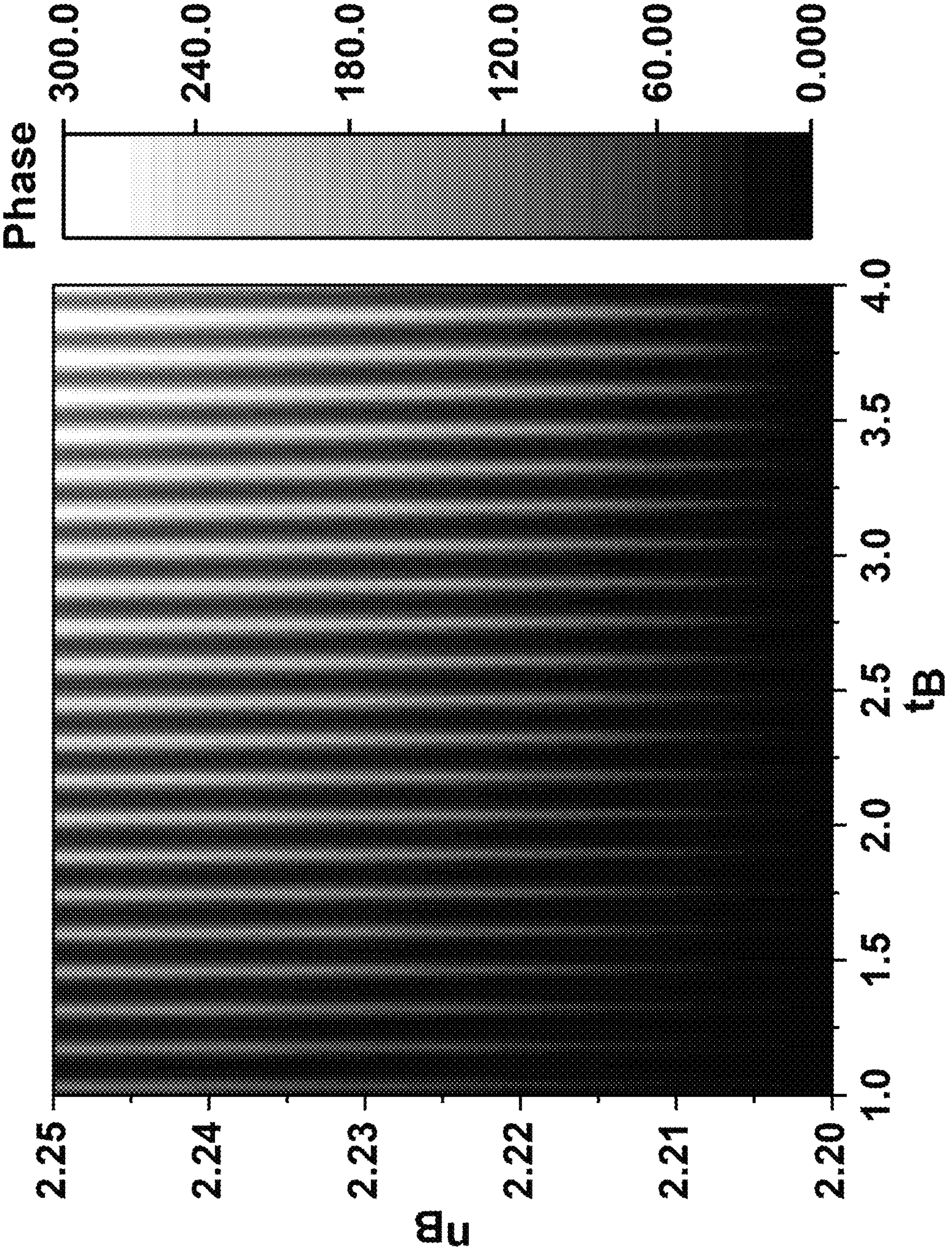
FIG. 10B shows a plot of refractive index ($n_B$) as a function of film thickness ($t_B$) showing variation of the phase of the reflected light at wavelength (λ) of 633 nm as the thickness of the barium strontium titanate (BST) film in the device shown in FIG. 9 is changed from 1 μm to 4 μm according to various embodiments.

FIG. 10A shows a plot of refractive index ($n_B$) as a function of film thickness ($t_B$) showing variation of the amplitude of the reflected light at wavelength (λ) of 633 nm as the thickness of the barium strontium titanate (BST) film in the device shown in FIG. 9 is changed from 1 μm to 4 μm according to various embodiments. FIG. 10B shows a plot of refractive index ($n_B$) as a function of film thickness ($t_B$) showing variation of the phase of the reflected light at wavelength (λ) of 633 nm as the thickness of the barium strontium titanate (BST) film in the device shown in FIG. 9 is changed from 1 μm to 4 μm according to various embodiments.

Figure 11:
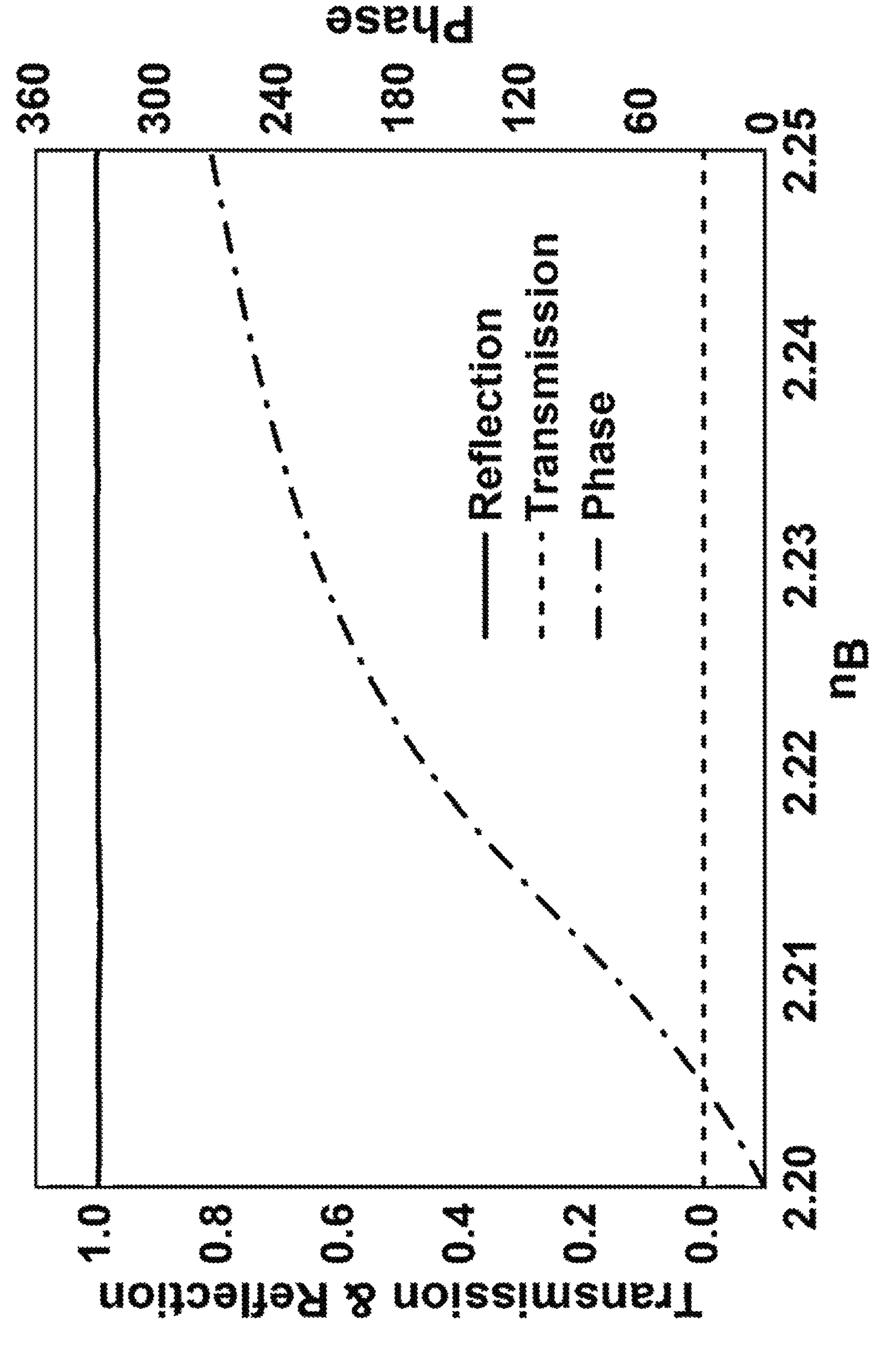
FIG. 11 is a plot of transmission and reflection/phase as a function of refractive index ($n_B$) illustrating the variation of reflection, transmission amplitude and reflection phase with refractive index of the tunable Gires-Tournois etalon (GTE) device shown in FIG. 9 according to various embodiments.
Figure 12:
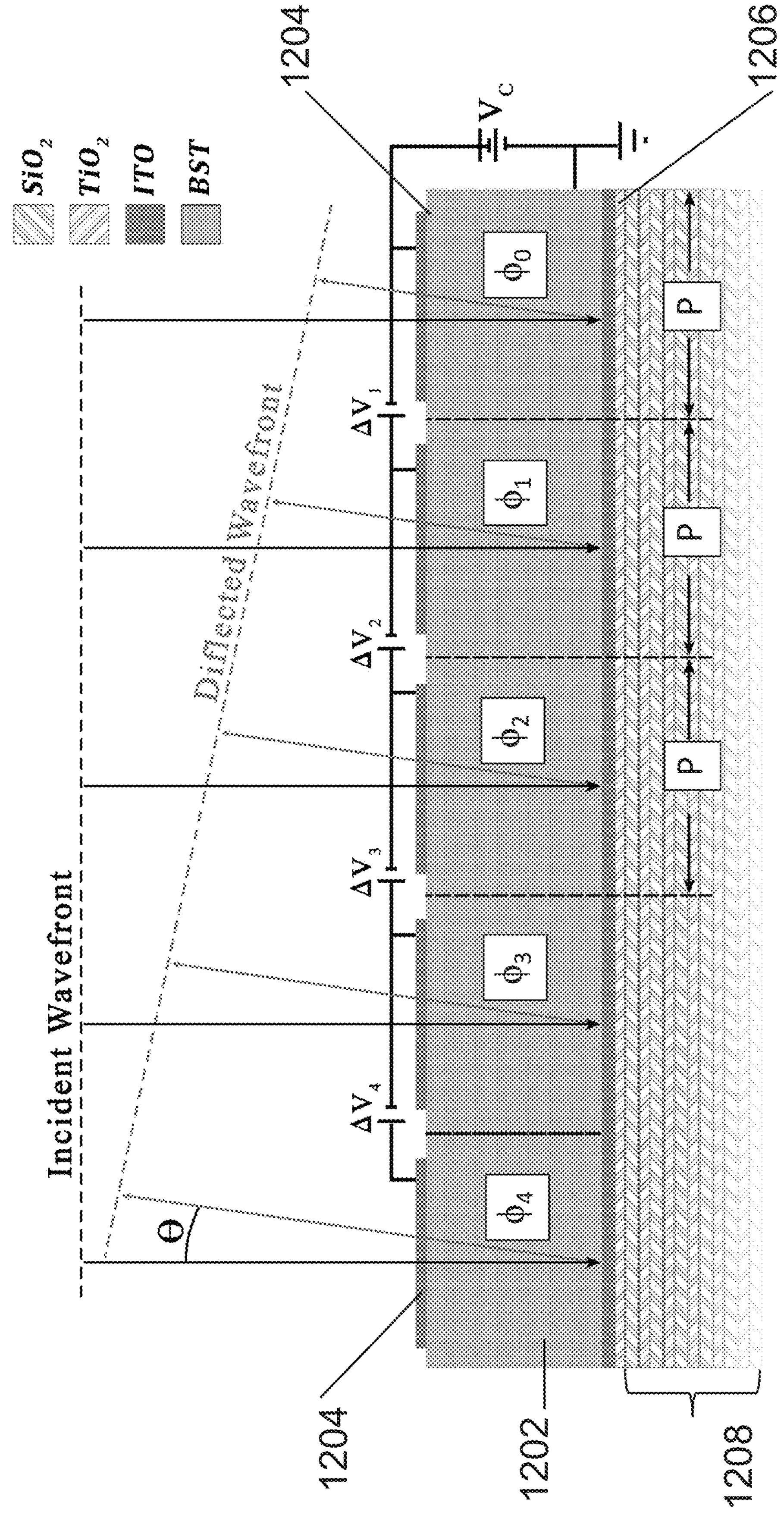
FIG. 12 is a schematic of a tunable optical device for electrically controlled reflective beam steering according to various embodiments.

FIG. 11 is a plot of transmission and reflection/phase as a function of refractive index ($n_B$) illustrating the variation of reflection, transmission amplitude and reflection phase with refractive index of the tunable Gires-Tournois etalon (GTE) device shown in FIG. 9 according to various embodiments. FIG. 12 is a schematic of a tunable optical device for electrically controlled reflective beam steering according to various embodiments.

The tunable optical device may include a ferroelectric layer 1202, e.g. an unpatterned BST film. The tunable optical device may also include a plurality of first electrodes 1204 and a second electrode 1206. In order to avoid clutter and to improve clarity, not all the first electrodes 1204 have been labelled.

The tunable optical device may include an array of unit cells formed on a flat unpatterned film 1202. Each unit cell of the array of unit cells may include one first electrode of the plurality of first electrodes 1204. The second electrode 1206 may be common to the plurality of unit cells. The refractive index of the BST in each unit cell may be controlled by an applied voltage. Hence, the phase of the reflected light may be progressively changed to steer the light to the desired angle by applying a progressive voltage difference to the cell arrays. According to the principle of equality of optical paths, it can be computed that the incident light may be deflected towards an angle of θ. If the progressive phase change is defined as $$\Delta\Phi = \Phi_{i+1} - \Phi_i = \frac{2\pi}{\lambda}\cdot P\cdot\sin\theta \tag{9}$$

or

-continued $$\Psi(x, y) = (2\pi/\lambda)\cdot x\cdot \sin\theta \quad (10)$$

The required phase change Ψ at each point (position x) may be calculated with the relationship and assigned to each unit cell.

Figure 13A:
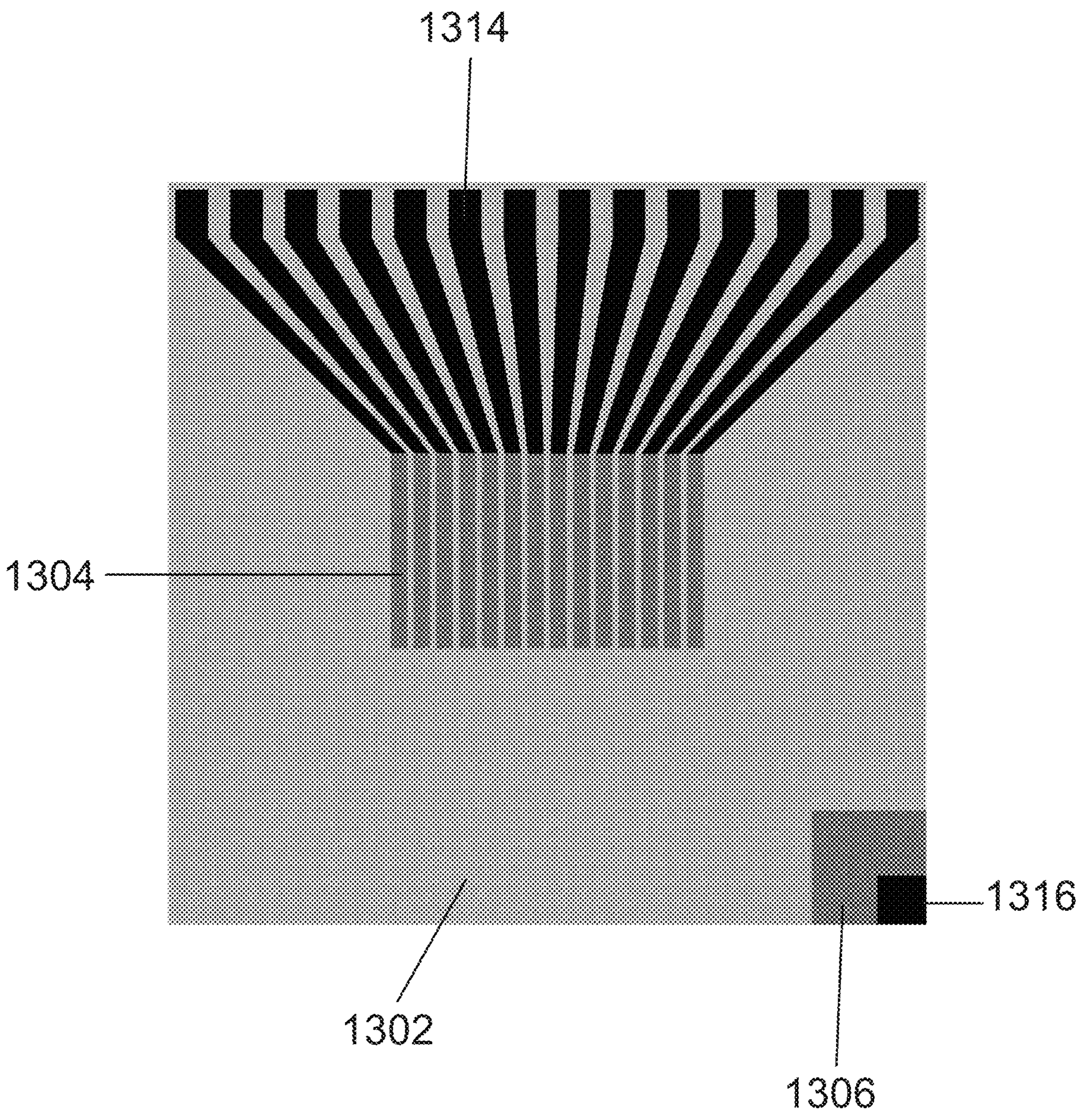
FIG. 13A is a schematic showing a top view of the one dimensional (1D) beam steering device according to various embodiments.
Figure 13B:
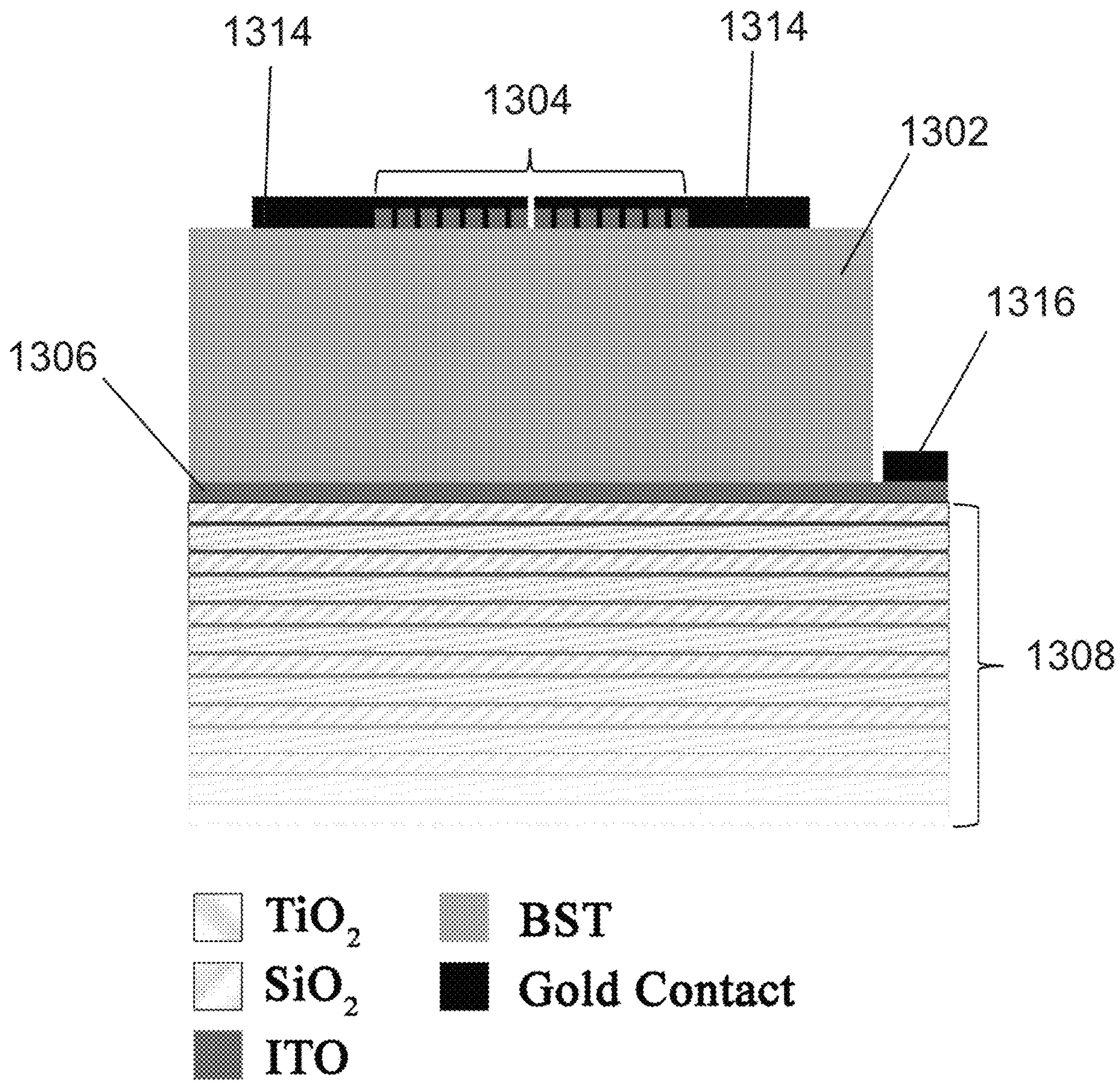
FIG. 13B is a schematic showing a cross-sectional side view of the one dimensional (1D) beam steering device shown in FIG. 13A according to various embodiments.

FIGS. 13A-B illustrate a possible one dimensional (1D) beam steering device according to various embodiments. FIG. 13A is a schematic showing a top view of the one dimensional (1D) beam steering device according to various embodiments. FIG. 13B is a schematic showing a cross-sectional side view of the one dimensional (1D) beam steering device shown in FIG. 13A according to various embodiments.

The device may include a ferroelectric layer 1302, e.g. an unpatterned BST film. The device may also include a plurality of first electrodes 1304 and a second electrode 1306. The plurality of first electrodes 1304 may be patterned ITO electrodes. The second electrode 1306 may be on a DBR 1308. The plurality of first electrodes 1304 may be coupled to top gold contacts 1314, while the second electrode 1306 may be coupled to bottom gold contact 1316.

Figure 14:
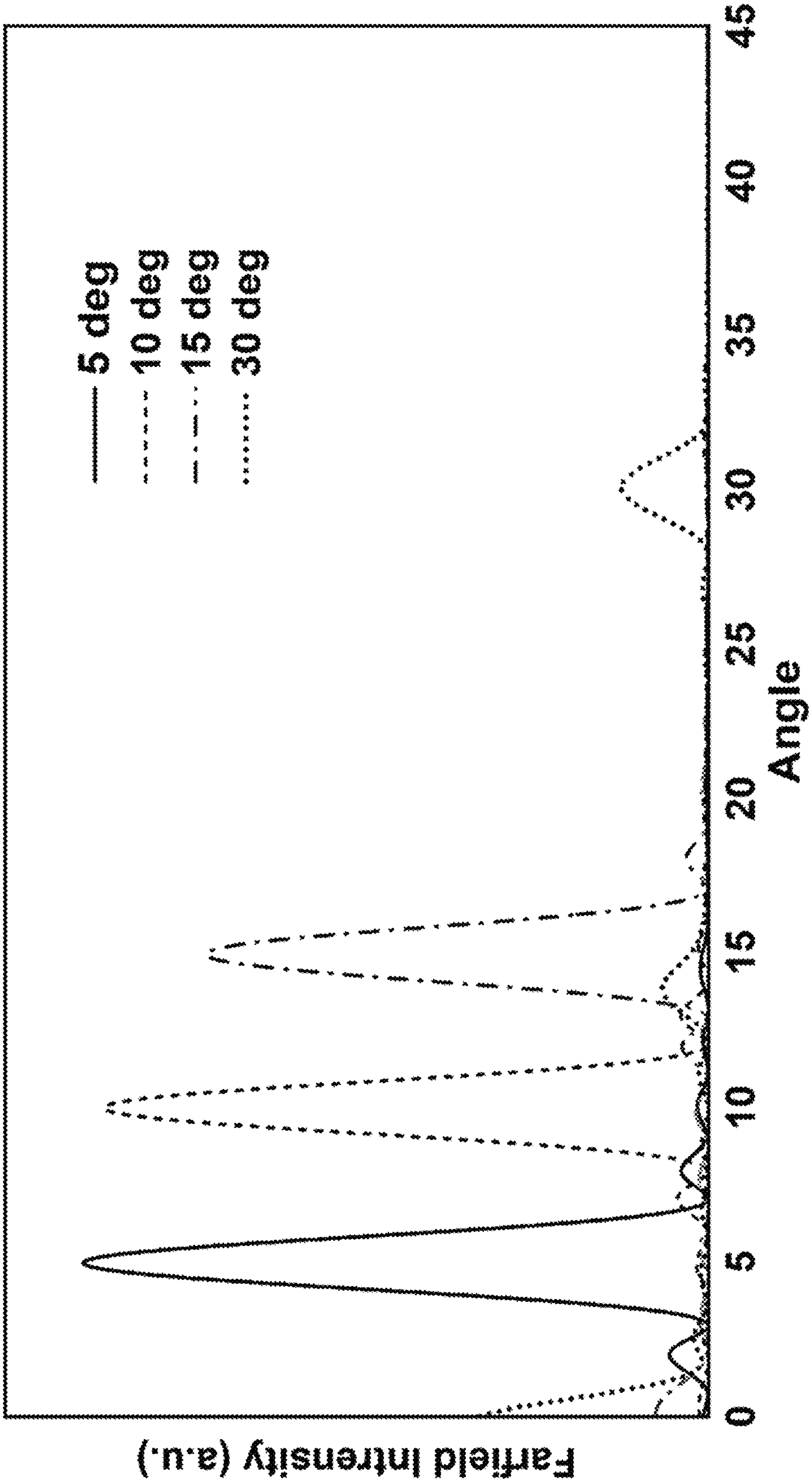
FIG. 14 is a plot of far-field intensity (in arbitrary units or a.u.) as a function of angle (in degrees or deg) illustrating simulated beam steering at far-field of the device shown in FIGS. 13A-B according to various embodiments.

FIG. 14 is a plot of far-field intensity (in arbitrary units or a.u.) as a function of angle (in degrees or deg) illustrating simulated beam steering at far-field of the device shown in FIGS. 13A-B according to various embodiments.

The period of the designed 50 unit cells is 300 nm and the thickness of the BST film is $t_b$=3890 nm. The refractive index of the BST film in each unit cell may be adjusted from 2.2 to 2.25, according to the Equation 10, and phase profile in FIG. 11. The beam steering shows good performance up to 15°.

However, the side lobes at 0° becomes larger going to the higher angles as shown for the beam steered to 30°. It is worth mentioning that these side lobes may be suppressed by optimizing the refractive index of unit cells.

Figure 15:
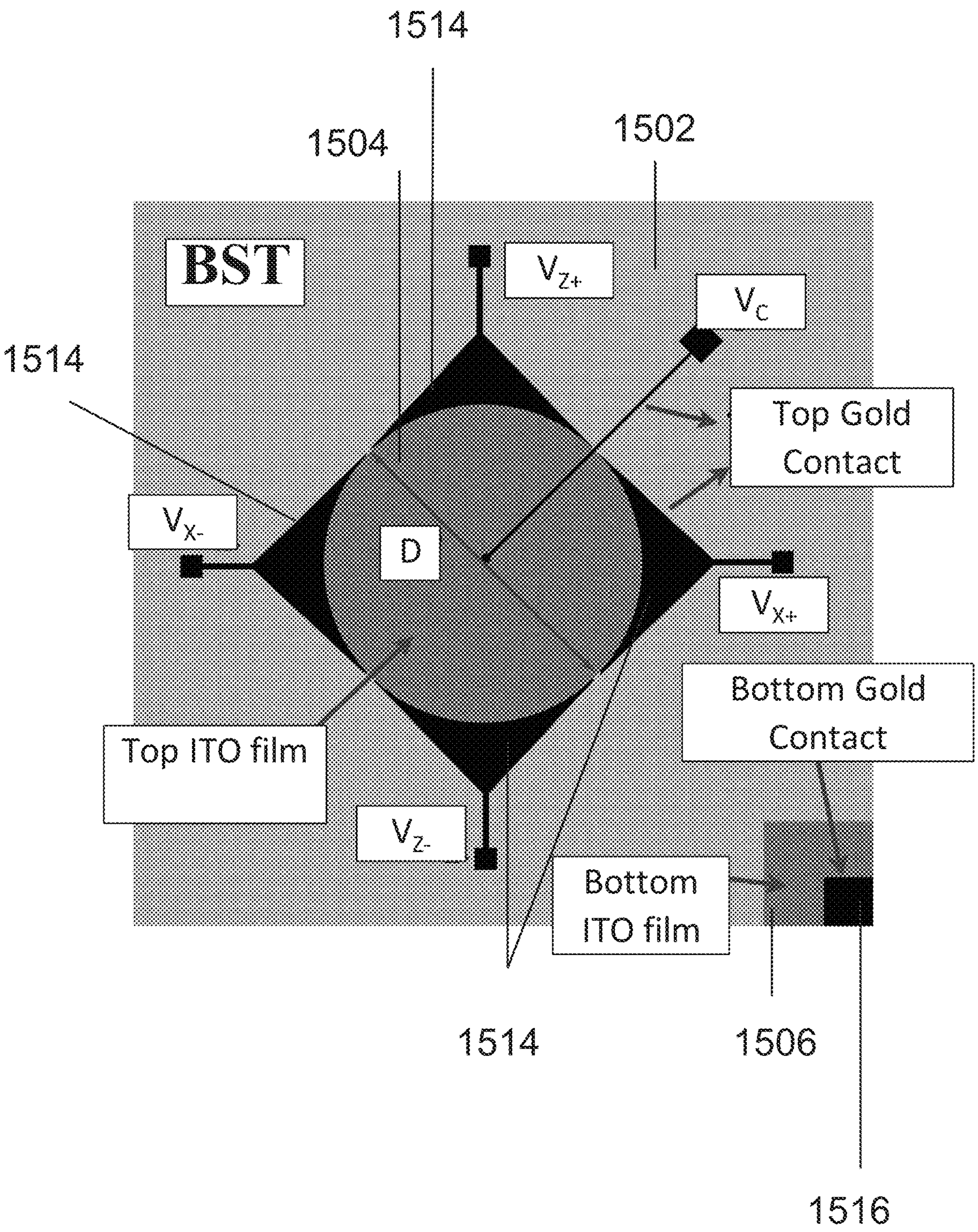
FIG. 15 is a schematic showing a top view of an universal tunable beam steering device according to various embodiments.
Figure 16:
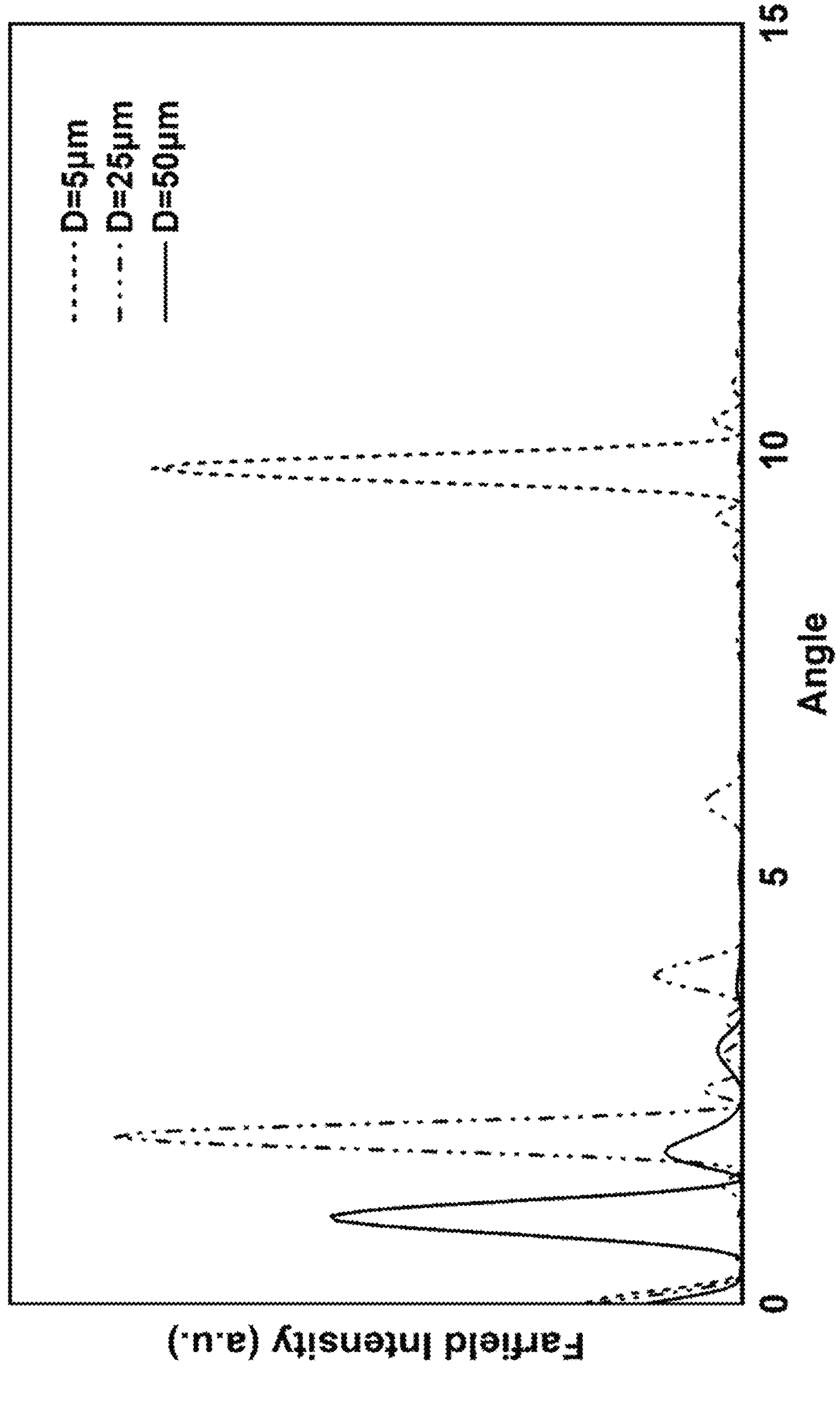
FIG. 16 is a plot of far-field intensity (in arbitrary units or a.u.) as a function of angle (in degrees) illustrating the far-field projection intensity of the device shown in FIG. 15 according to various embodiments.

FIG. 15 is a schematic showing a top view of an universal tunable beam steering device according to various embodiments. The device may include a ferroelectric film 1502, e.g. BST, a first electrode 1504 (e.g. ITO film) on a first side of the ferroelectric film 1502 and a second electrode 1506 (e.g. ITO film) on a second side of the ferroelectric film 1502 opposite the first side. The device may also include 4 gold contacts 1514 coupled to the first electrode 1504. The device may additionally include a gold contact 1516 coupled to the second electrode 1506. The device may be used for electrically controlled beam steering and may function as an electrically controlled flat lens with tunable focusing. The bottom ITO film 1506 may be grounded (V=0), similar to the previous design. If $V_C$=0 and $V_{Z+}=V_{Z-}=V_{X+}=V_{X-}$ are at positive or negative voltages, the device may act as a tunable lens. If $V_C$ is an open circuit (not connected to any voltage), and $V_{Z+}$, $V_{Z-}$, $V_{X+}$, and $V_{X-}$ are controlled separately, it may be used for 2D beam steering. Three beam steering devices with different sizes (i.e. diameter D of the top ITO film 1504) of 50, 25, and 5 μm are designed and simulated. In all three simulations, the refractive index of BST film is changed linearly from 2.25 to 2.2 from left to the right along the x-axis. The farfield radiations for three different dimensions are shown in FIG. 16. FIG. 16 is a plot of farfield intensity (in arbitrary units or a.u.) as a function of angle (in degrees) illustrating the farfield projection intensity of the device shown in FIG. 15 according to various embodiments.

According to the simulations, the smaller diameter D may generate larger beam steering since the slope of the refractive index change is increased as the dimension is decreased.

The maximum steering angle is achieved at the maximum change in the BST refractive index (Δn=0.05). 2D beam steering may be controlled by the four electrodes 1514 in contact with the top ITO film 1504.

The device may act as a tunable focusing lens when $V_C$=0 and $V_{Z+}=V_{Z-}=V_{X+}=V_{X-}$ are at positive voltages. In other words, the middle of the ITO film 1504 may be biased at zero voltage ($V_C$=0), while positive voltages may be applied to sides all around the ITO film 1504 through the 4 contacts 1514. Accordingly, such a biasing may result in a linear change of refractive index of the BST film 1502 from the middle to the sides of the circular region.

The change in the refractive index may be increased from Δn=0.001 to Δn=0.05 in a 2D simulation. Hence, the 2D simulation may illustrate the results on the diameter (D=100 μm). As could be seen from the results, the focal point may be decreased from f≈3.5 mm to f≈1.5 mm.

The profile of the phase change may be hyperbolic like $\varnothing(x,z)=2\pi/\lambda)(\sqrt{x^2+z^2+f^2}-f)$. The change in the refractive index may be linear in the BST film $n_{BST}(x, y)=(n_0+\Delta n)-(4\Delta n/D)(\sqrt{x^2+z^2})$, where $n_0$=2.25. However, the linear change in the refractive index may not translate into linear phase change as shown in the simulation results for the phase of the reflected light (shown in FIG. 11).

Figure 17A:
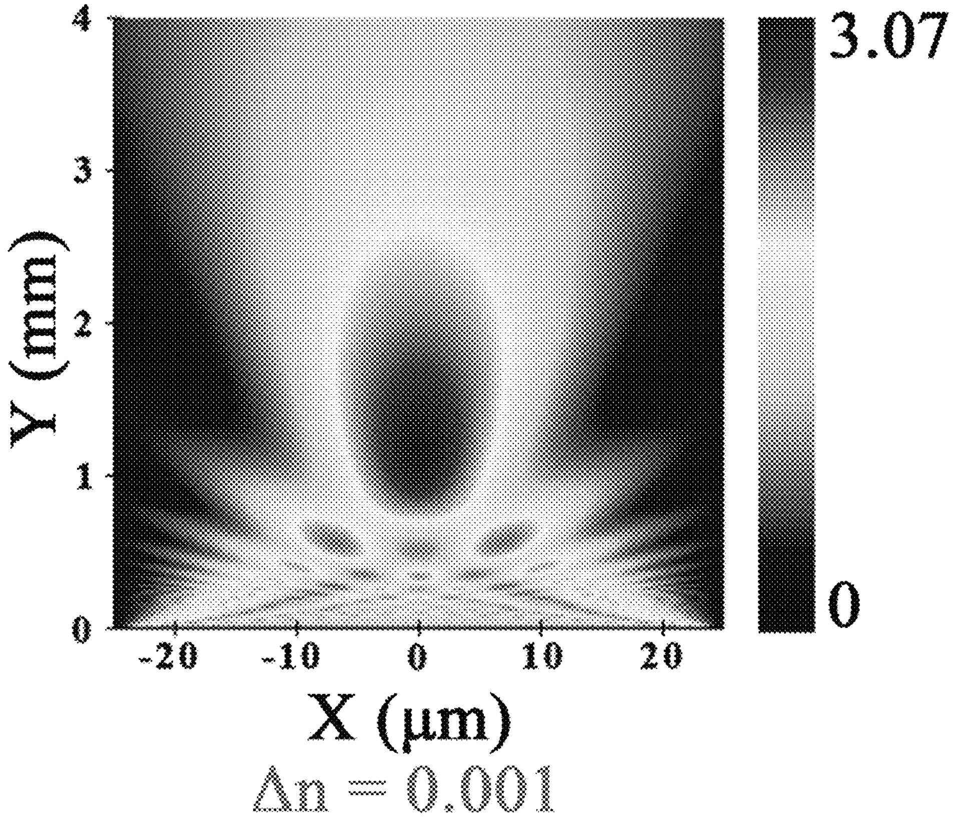
FIG. 17A is a plot of distance along the y direction (in microns or μm) as a function of distance along the x direction (in microns or μm) showing the far-field projection of the tunable device when the change in refractive index (Δn) is 0.001.
Figure 17B:
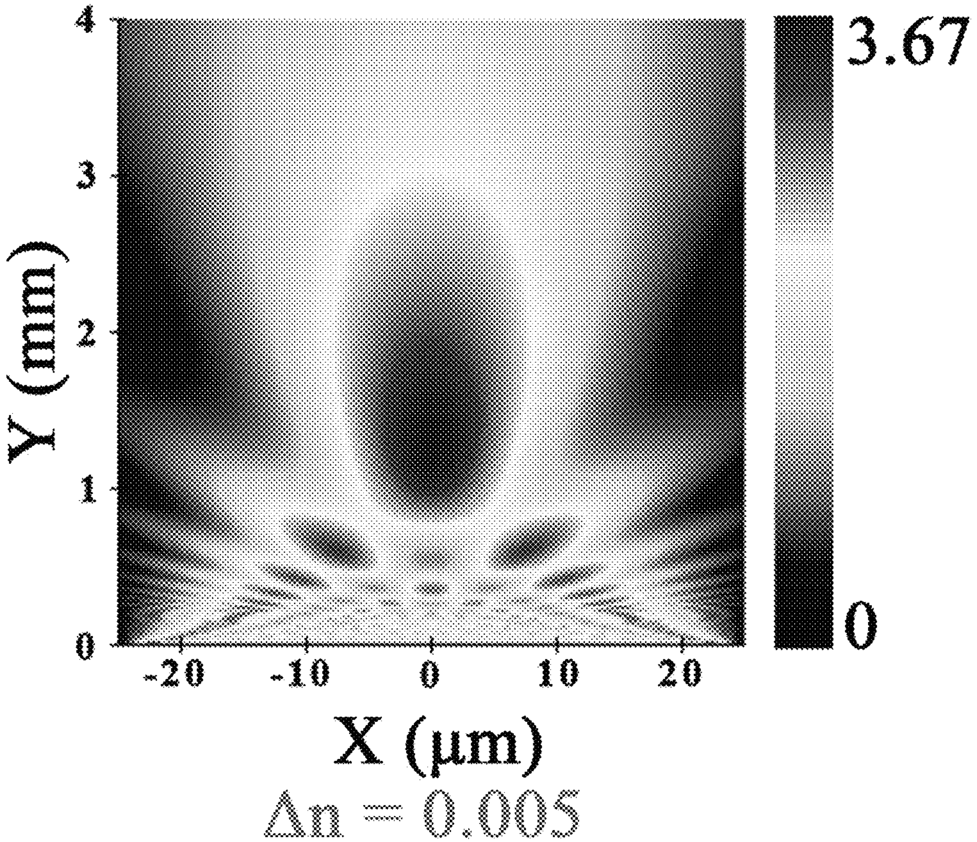
FIG. 17B is a plot of distance along the y direction (in microns or μm) as a function of distance along the x direction (in microns or μm) showing the far-field projection of the tunable device when the change in refractive index (Δn) is 0.005.
Figure 17C:
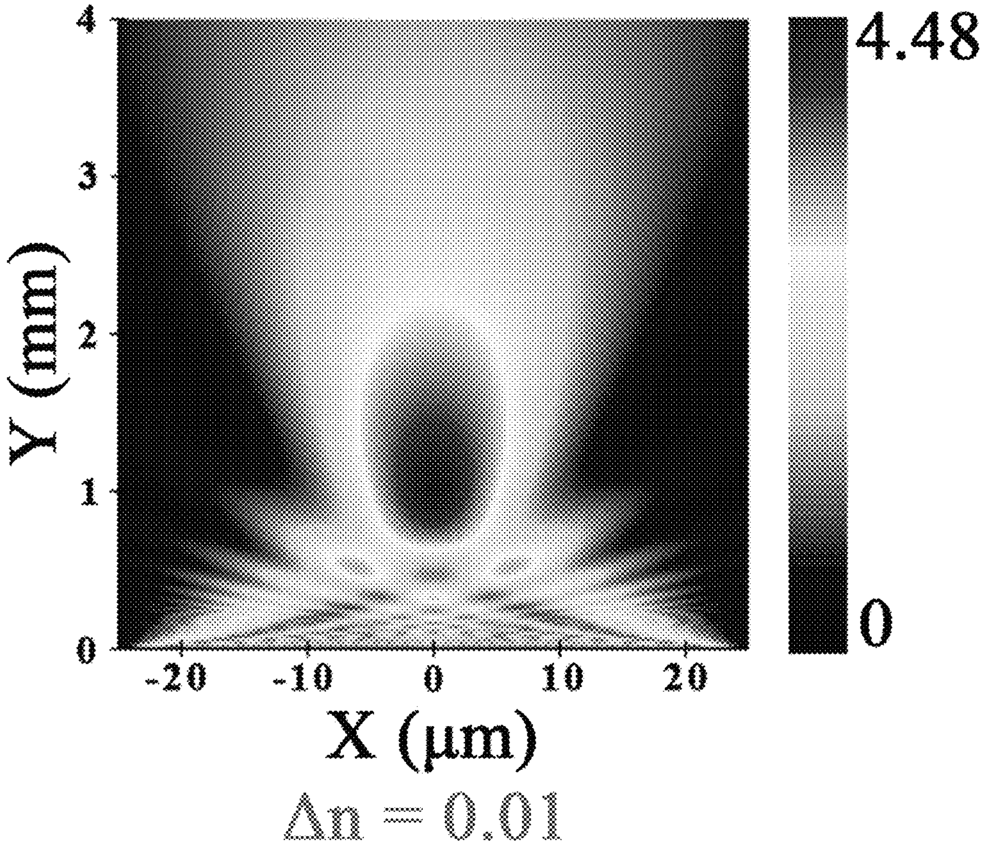
FIG. 17C is a plot of distance along the y direction (in microns or μm) as a function of distance along the x direction (in microns or μm) showing the far-field projection of the tunable device when the change in refractive index (Δn) is 0.01.
Figure 17D:
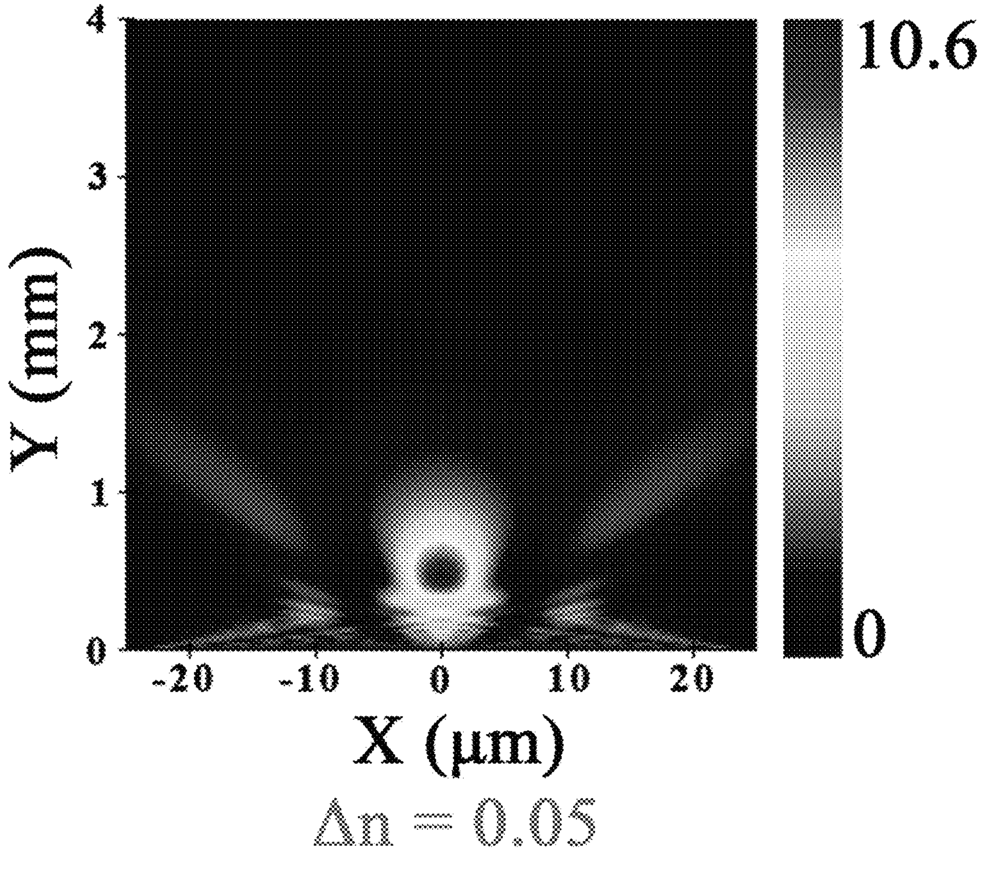
FIG. 17D is a plot of distance along the y direction (in microns or μm) as a function of distance along the x direction (in microns or μm) showing the far-field projection of the tunable device when the change in refractive index (Δn) is 0.05.

FIG. 17A is a plot of distance along the y direction (in microns or pm) as a function of distance along the x direction (in microns or μm) showing the farfield projection of the tunable device when the change in refractive index (Δn) is 0.001. FIG. 17B is a plot of distance along the y direction (in microns or μm) as a function of distance along the x direction (in microns or μm) showing the farfield projection of the tunable device when the change in refractive index (Δn) is 0.005. FIG. 17C is a plot of distance along the y direction (in microns or μm) as a function of distance along the x direction (in microns or μm) showing the farfield projection of the tunable device when the change in refractive index (Δn) is 0.01. FIG. 17D is a plot of distance along the y direction (in microns or μm) as a function of distance along the x direction (in microns or μm) showing the farfield projection of the tunable device when the change in refractive index (Δn) is 0.05.

Figure 18:
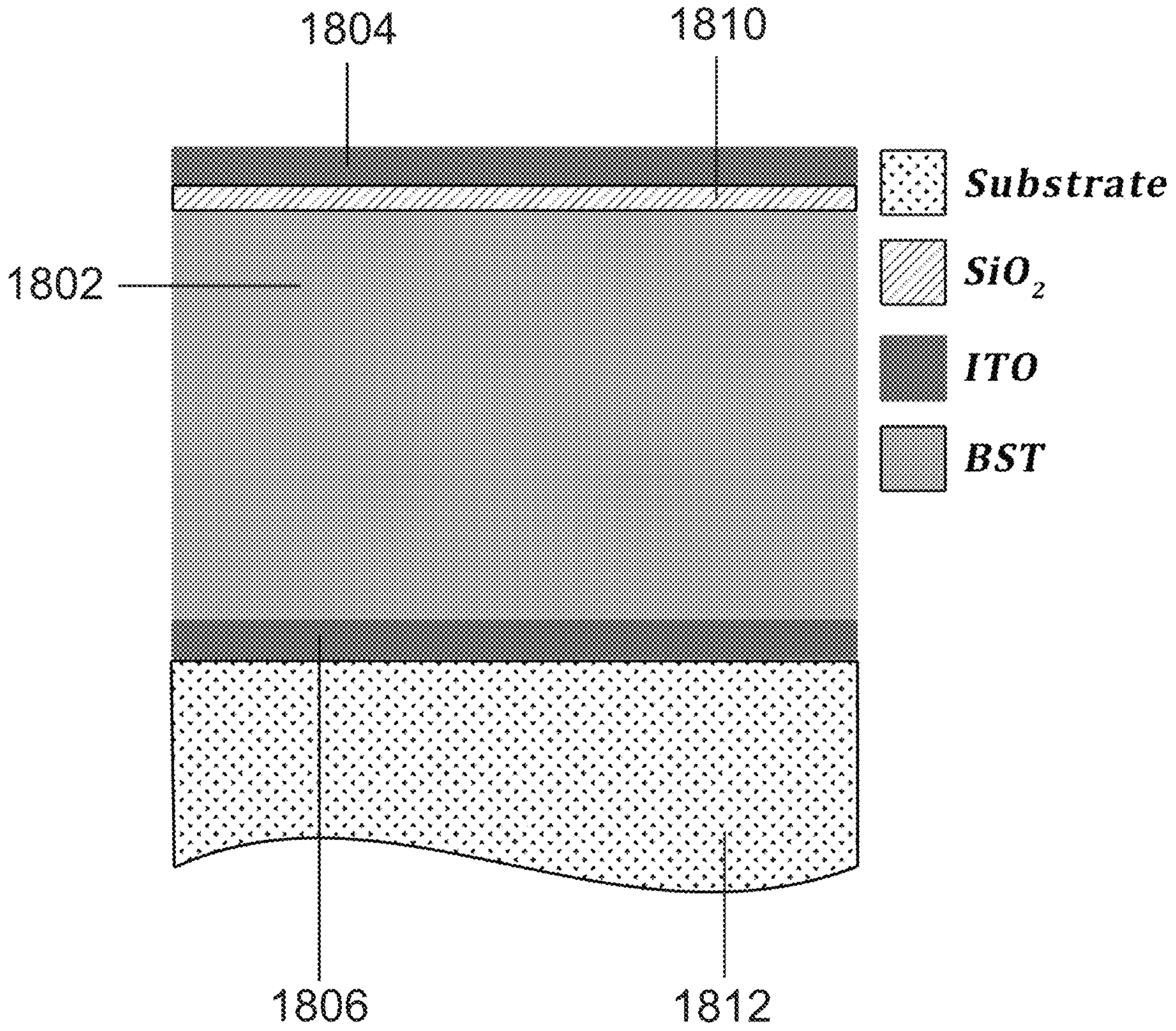
FIG. 18 is a schematic of a tunable optical device according to various embodiments.

FIG. 18 is a schematic of a tunable optical device according to various embodiments. The tunable optical device may include a ferroelectric layer 1802 (e.g. BST film), a first electrode 1804 on a first side of the ferroelectric layer 1802, and a second electrode 1806 on a second side of the ferroelectric layer 1802 opposite the first side. The tunable optical device may also include a silicon oxide layer 1810 between the first electrode 1804 and the ferroelectric layer. The tunable optical device may additionally include a substrate 1812, such as a sapphire substrate. The device shown in FIG. 18 may operate in the transmission mode. The thickness of the BST film 1802 may be increased from 1 μm to 6 μm.

Figure 19A:
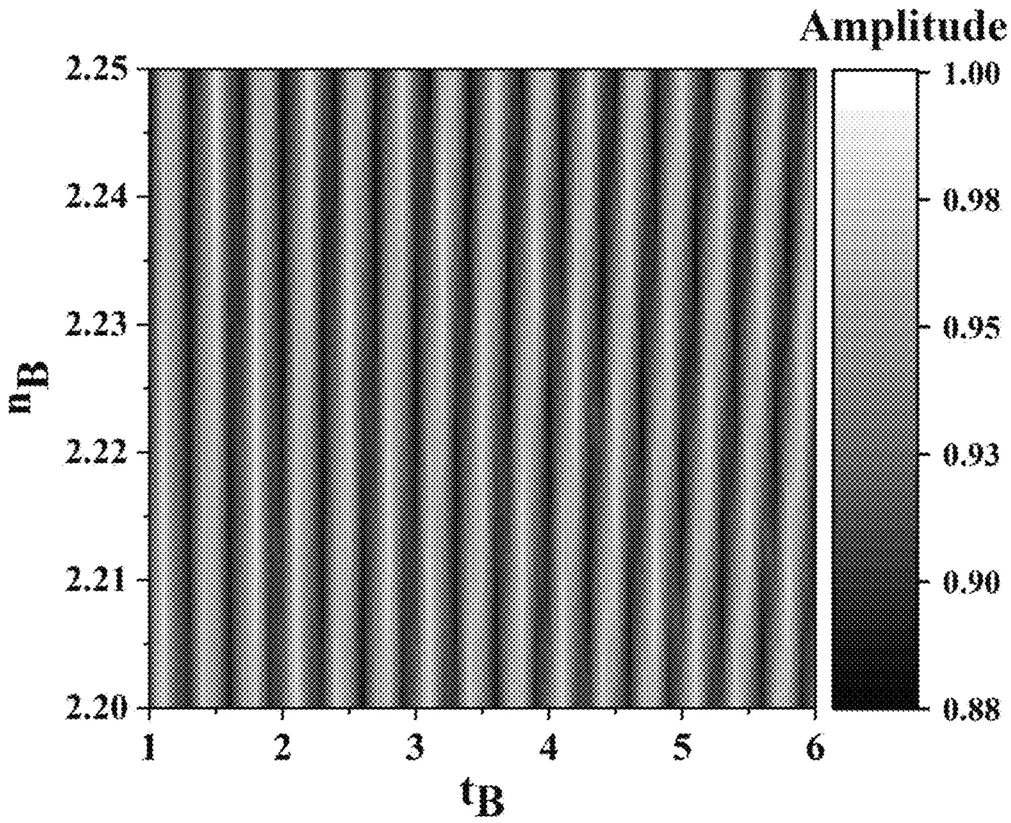
FIG. 19A shows a plot of refractive index ($n_B$) as a function of film thickness ($t_B$) showing variation of the amplitude of the transmitted light at wavelength (λ) of 633 nm as the thickness of the barium strontium titanate (BST) film in the device shown in FIG. 18 is changed from 1 μm to 6 μm according to various embodiments.
Figure 19B:
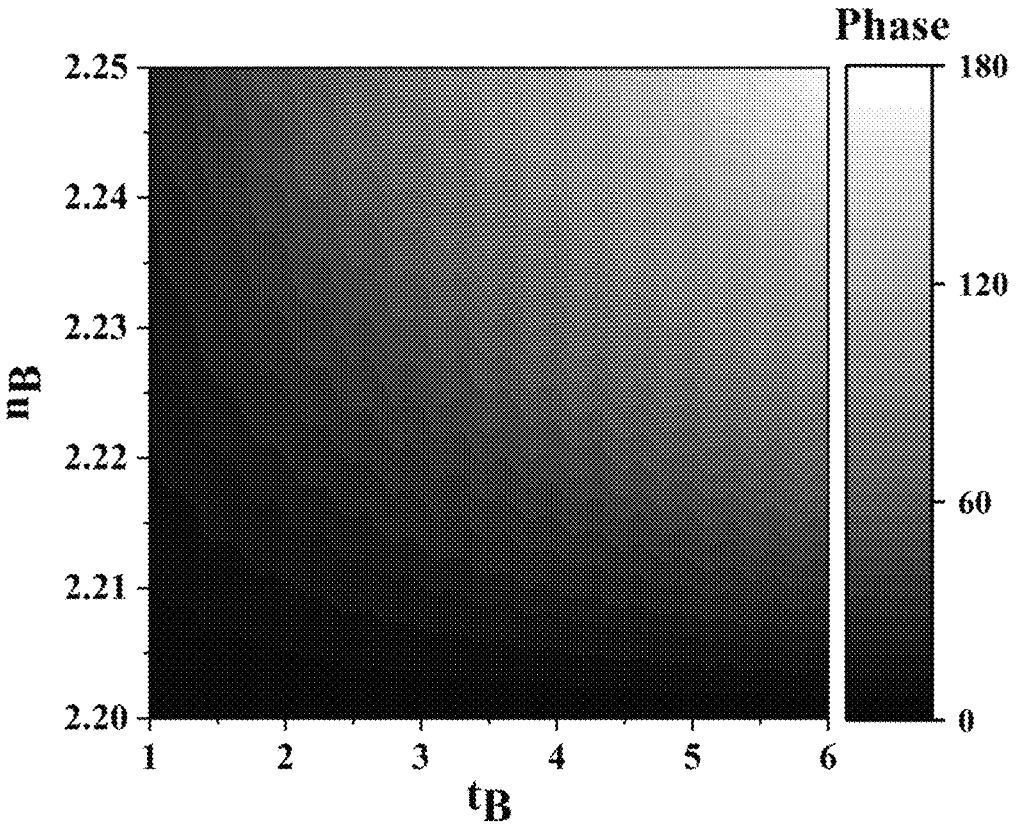
FIG. 19B shows a plot of refractive index ($n_B$) as a function of film thickness ($t_B$) showing variation of the phase of the transmitted light at wavelength (λ) of 633 nm as the thickness of the barium strontium titanate (BST) film in the device shown in FIG. 18 is changed from 1 μm to 6 μm according to various embodiments.

FIG. 19A shows a plot of refractive index ($n_B$) as a function of film thickness ($t_B$) showing variation of the amplitude of the transmitted light at wavelength (λ) of 633 nm as the thickness of the barium strontium titanate (BST) film in the device shown in FIG. 18 is changed from 1 μm to 6 μm according to various embodiments. FIG. 19B shows a plot of refractive index ($n_B$) as a function of film thickness ($t_B$) showing variation of the phase of the transmitted light at wavelength (λ) of 633 nm as the thickness of the barium strontium titanate (BST) film in the device shown in FIG. 18 is changed from 1 μm to 6 μm according to various embodiments.

Figure 20:
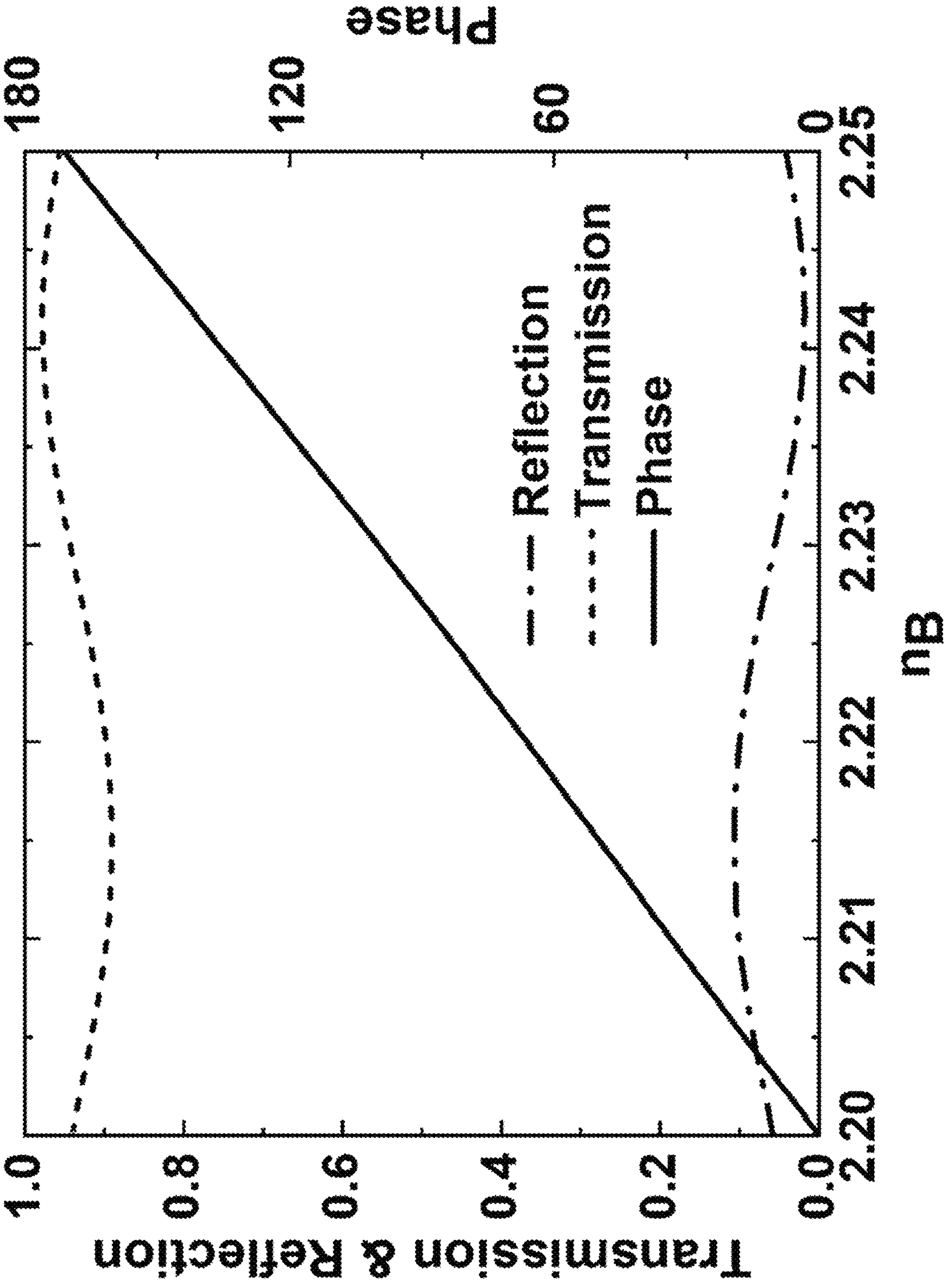
FIG. 20 is a plot of transmission and reflection/phase as a function of refractive index (nB) illustrating the variation of reflection, transmission amplitude and transmission phase with refractive index of the tunable optical device shown in FIG. 18 according to various embodiments.

FIG. 20 is a plot of transmission and reflection/phase as a function of refractive index (nB) illustrating the variation of reflection, transmission amplitude and transmission phase with refractive index of the tunable optical device shown in FIG. 18 according to various embodiments.

In transmission mode, $t_b$=6000 nm thick BST film may provide almost 180 degrees of the phase change in the phase of the transmitted light. This phase change may be sufficient to design all of the above devices including tunable lens and beam steering working in transmission mode.

Figure 21A:
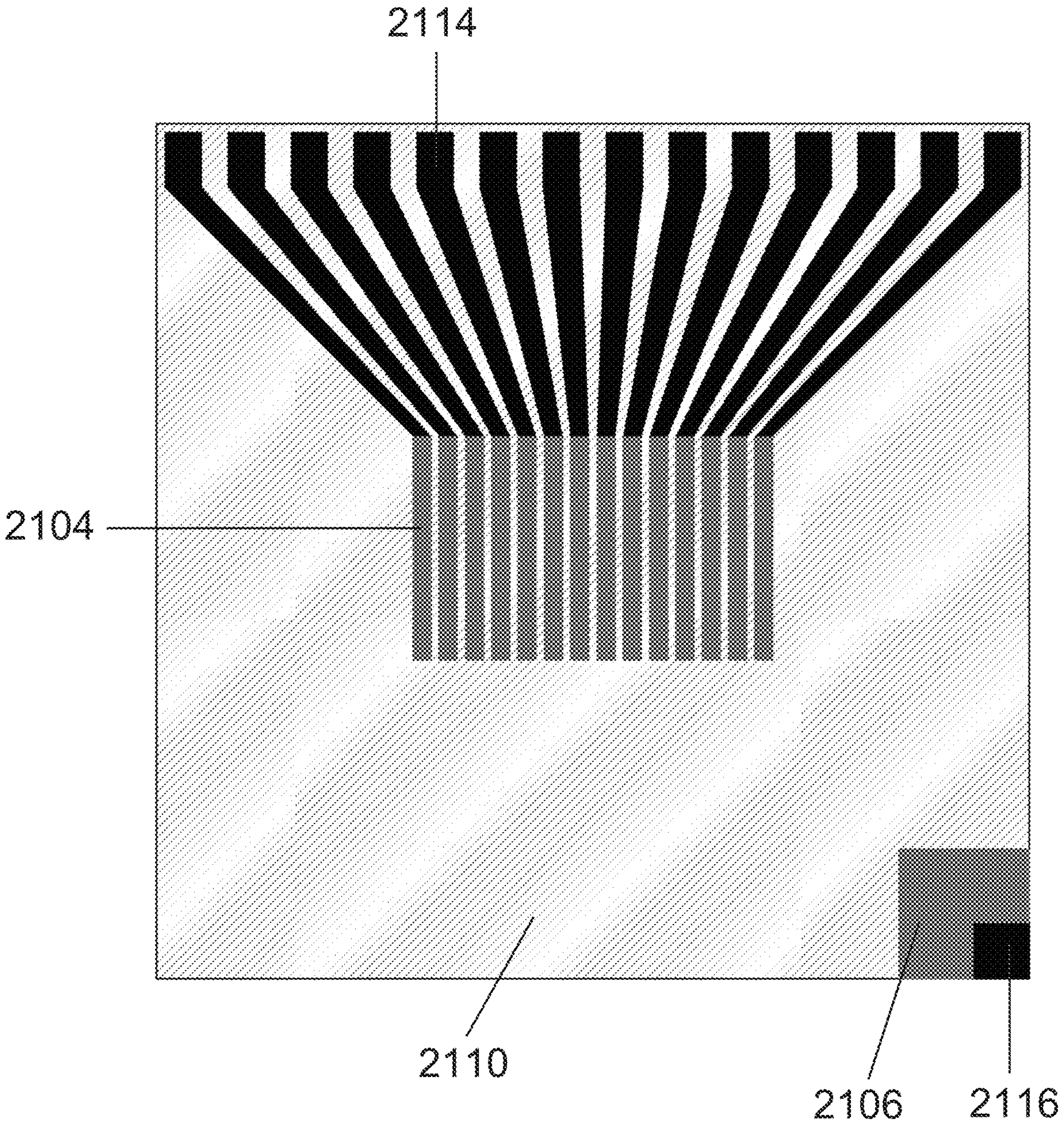
FIG. 21A is a schematic showing a top view of the beam steering device according to various embodiments.
Figure 21B:
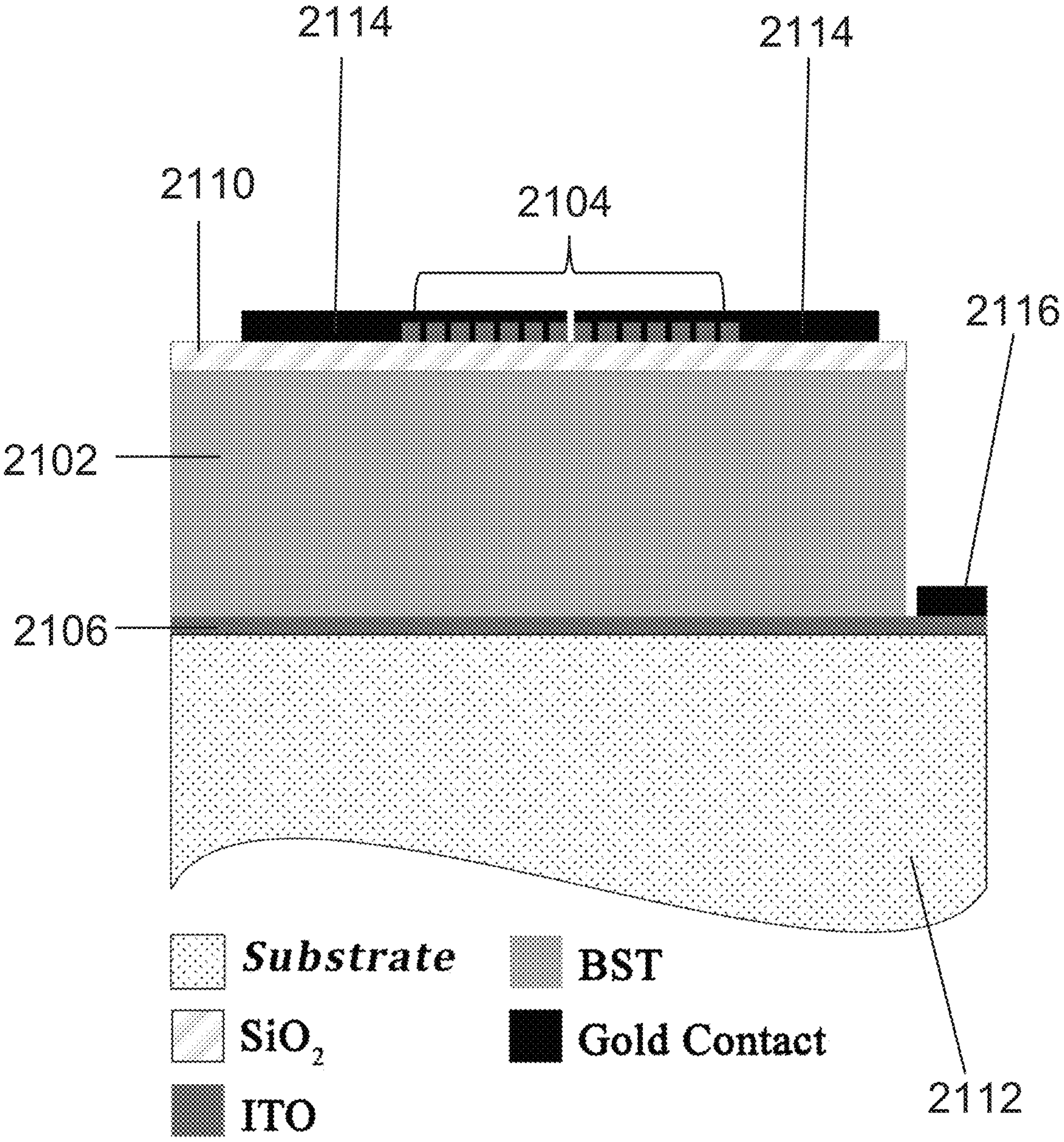
FIG. 21B is a schematic showing a cross-sectional side view of the beam steering device shown in FIG. 21A according to various embodiments.

FIGS. 21A-B illustrate a beam steering device operating in the transmission mode according to various embodiments. FIG. 21A is a schematic showing a top view of the beam steering device according to various embodiments. FIG. 21B is a schematic showing a cross-sectional side view of the beam steering device shown in FIG. 21A according to various embodiments.

The device may include a ferroelectric layer 2102, e.g. a BST film. The device may also include a plurality of first electrodes 2104 and a second electrode 2106. The plurality of first electrodes 2104 may be patterned ITO electrodes. The device may also include a silicon oxide layer 2110 between the plurality of first electrodes 2104 and the ferroelectric layer 2102. The second electrode 2106 may be on a sapphire substrate 2112. The plurality of first electrodes 2104 may be coupled to top gold contacts 2114, while the second electrode 2106 may be coupled to bottom gold contact 2116. The simulated results are shown in FIG. 22.

Figure 22:
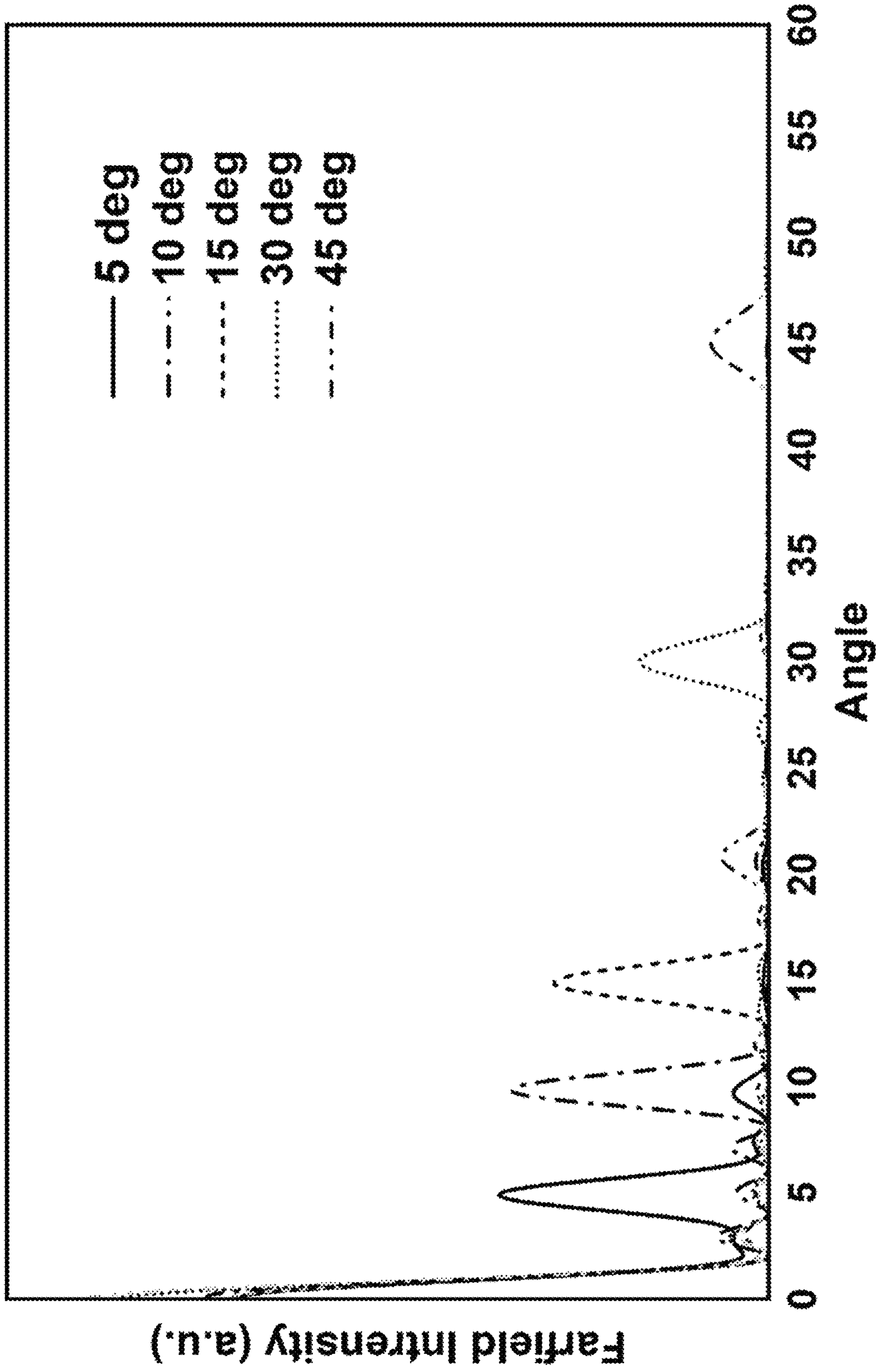
FIG. 22 is a plot of far-field intensity (in arbitrary units or a.u.) as a function of angle (in degrees or deg) illustrating far-field projection intensity of the device shown in FIGS. 21A-B according to various embodiments.

FIG. 22 is a plot of farfield intensity (in arbitrary units or a.u.) as a function of angle (in degrees or deg) illustrating farfield projection intensity of the device shown in FIGS. 21A-B according to various embodiments.

Compared to the reflection mode involving the bottom DBR, the transmission mode may have a stronger undesired projection at 0 degree. However, the main lobes may go further up to 45 degrees.

Figure 23:
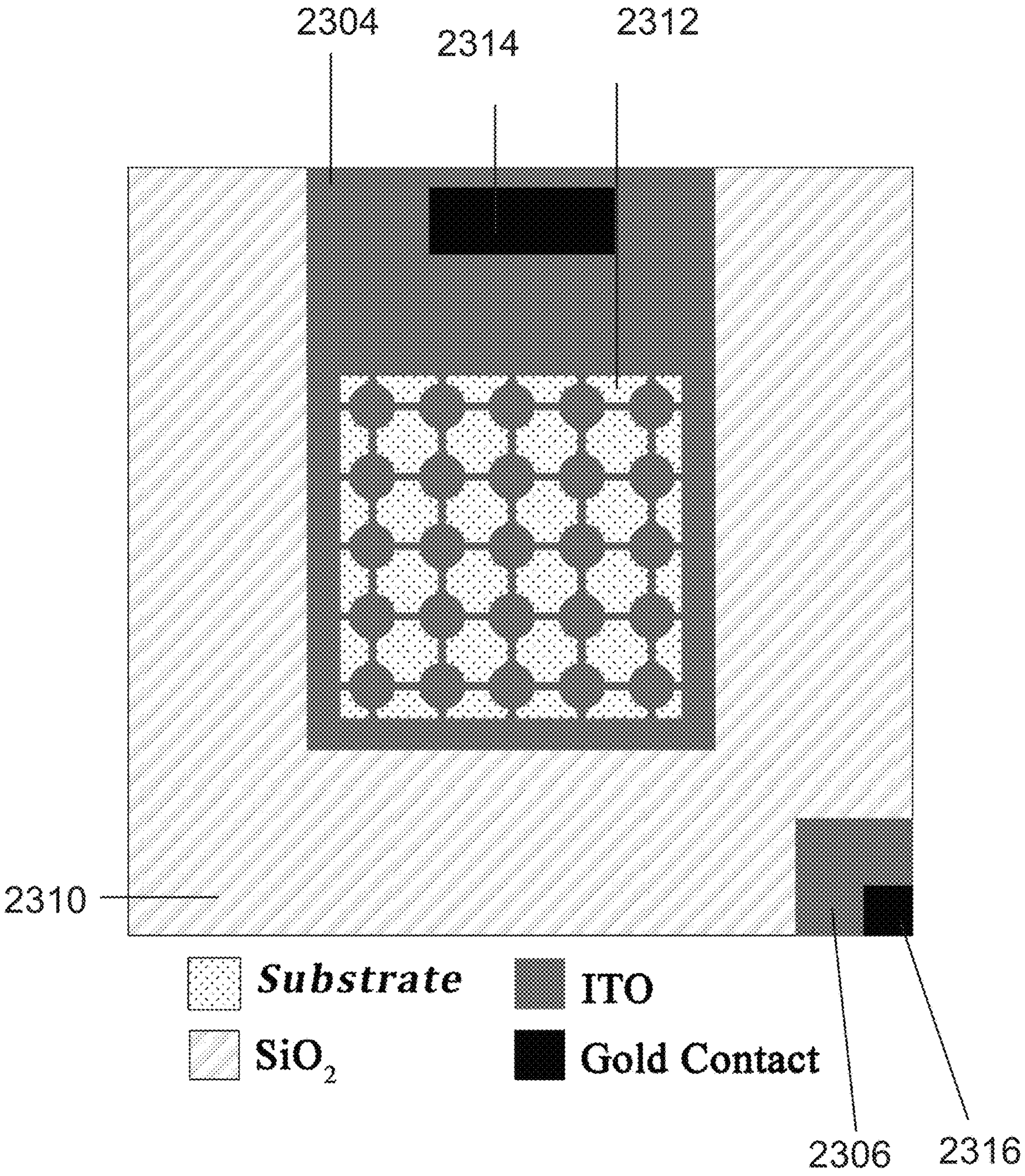
FIG. 23 is a schematic showing a top view of the tunable absorber-modulator device according to various embodiments.

A circular nanorod (ITO-BST-ITO) resonator is designed as a tunable absorber on a sapphire substrate as shown in FIG. 23. FIG. 23 is a schematic showing a top view of the tunable absorber-modulator device according to various embodiments. The device may include a plurality of nanorod, each nanorod including a ferroelectric, e.g. BST, layer (not shown in FIG. 23), with a top ITO film 2304 on a first side of the BST layer and a bottom ITO film 2306 on a second side of the BST layer opposite the first side. The device may additionally include a top gold contact 2314 in electrical connection with the top ITO film 2304 and a bottom gold contact 2316 in electrical connection with the bottom ITO film 2306. The BST layer, the ITO films 2304, 2306 and the contacts 2314, 2316 may be over a sapphire substrate 2312. A portion of the device not covered by the top ITO film 2304 may be covered by a silicon dioxide layer 2310. The top ITO film may be 5 nm thick, the bottom ITO film may be 30 nm thick, and the BST film may be 575 nm while the period may be 400 nm.

Figure 24:
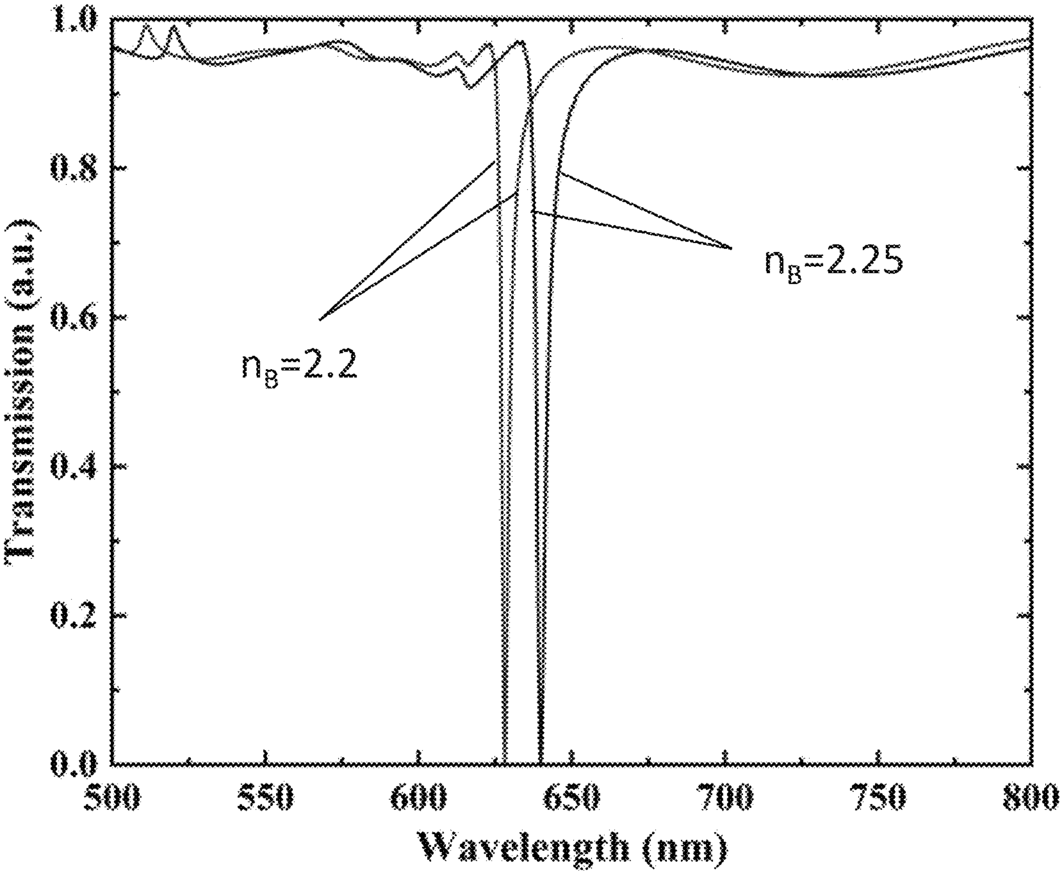
FIG. 24 is a plot of transmission (in arbitrary units or a.u.) as a function of wavelength (in nanometer or nm) illustrating the transmission spectra of the tunable absorber at different refractive indexes according to various embodiments.

FIG. 24 is a plot of transmission (in arbitrary units or a.u.) as a function of wavelength (in nanometer or nm) illustrating the transmission spectra of the tunable absorber at different refractive indexes according to various embodiments. As the refractive index of the BST film may be changed by applying a voltage between the bottom ITO electrode and the top ITO electrode, the resonance wavelength of the resonator may be shifted from 640 to 628 nm. The operational frequency may be tuned by changing the diameter of the nanorod.

Figure 25A:
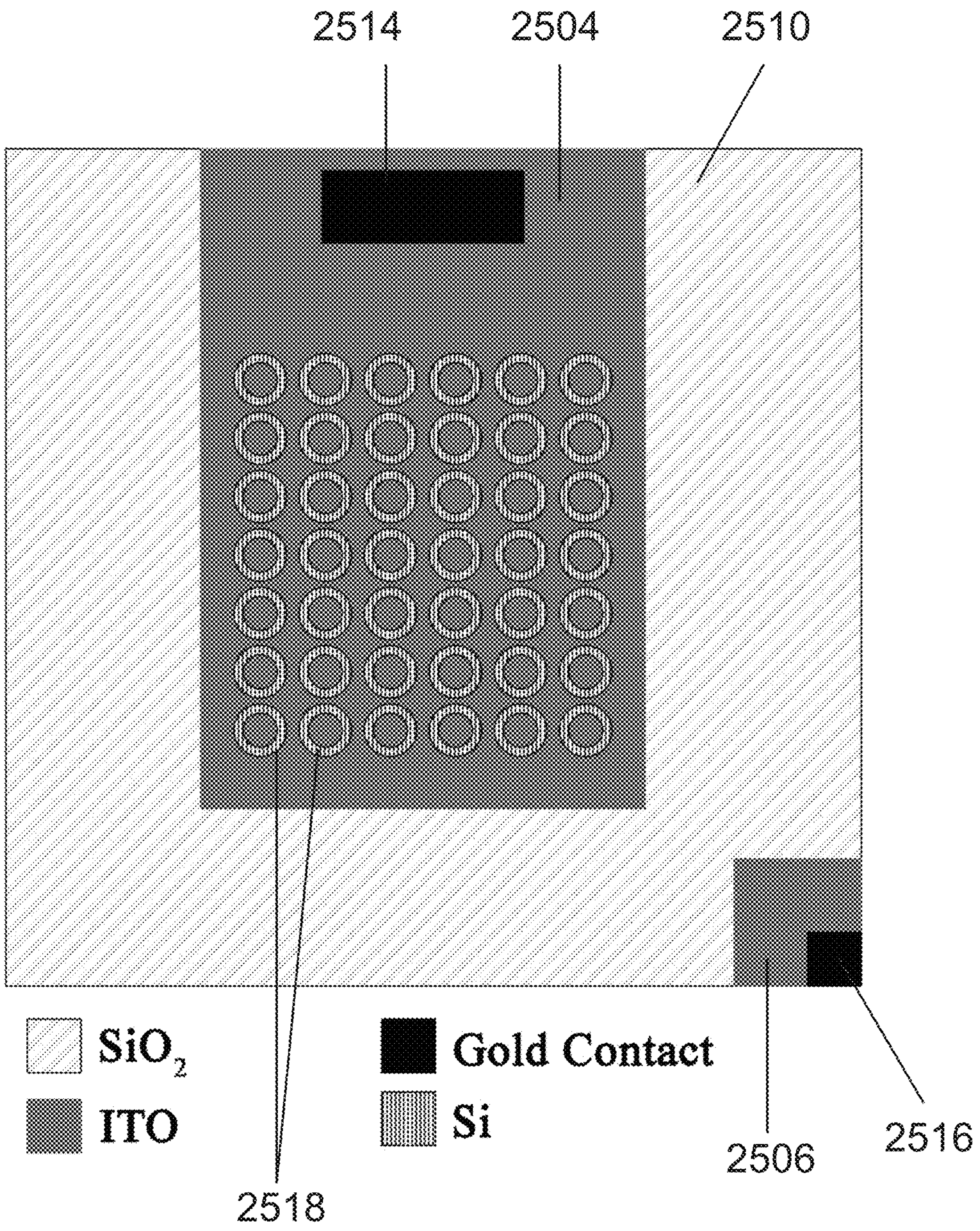
FIG. 25A is a schematic showing a top view of the tunable absorber-modulator device according to various embodiments.
Figure 25B:
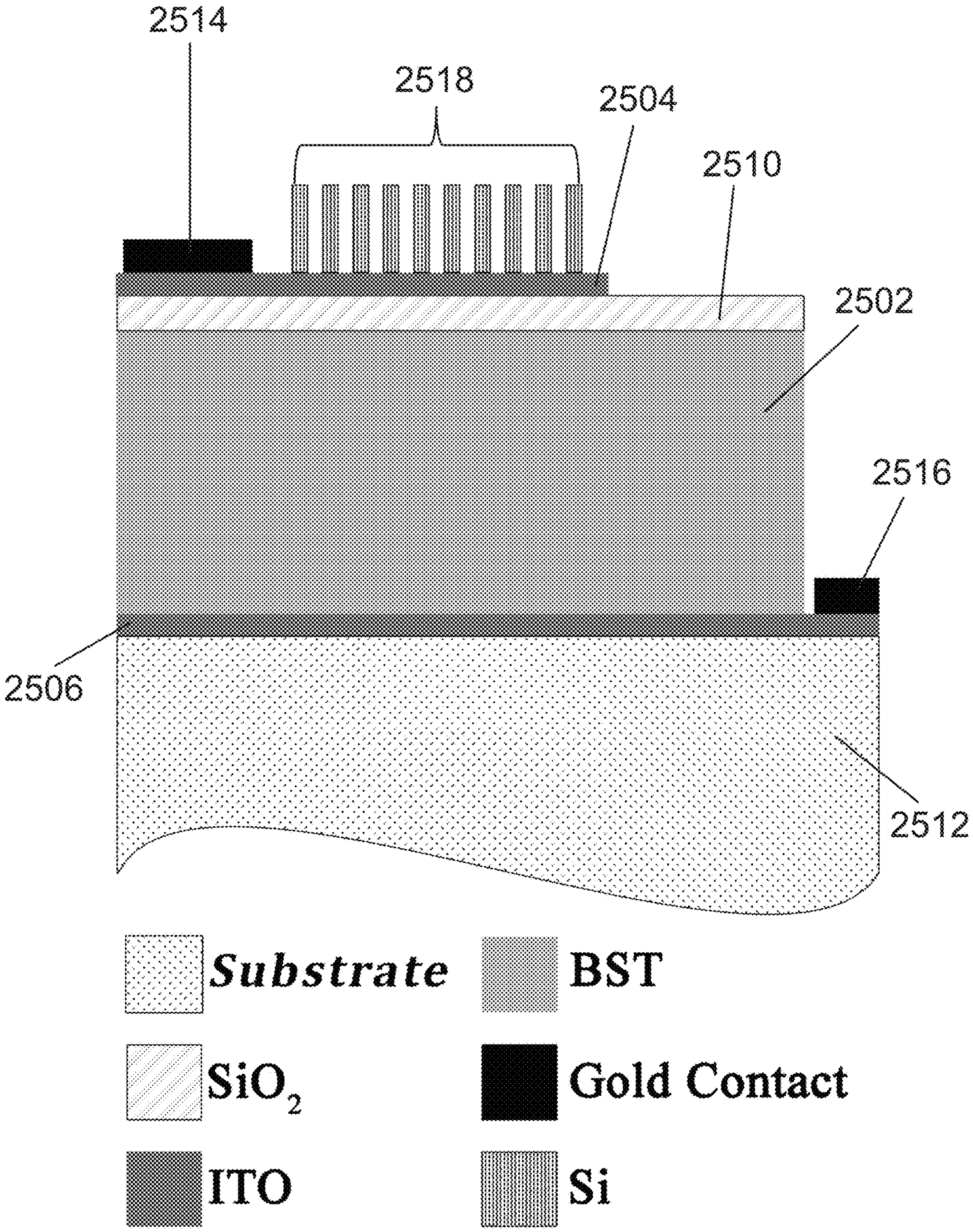
FIG. 25B is a schematic showing a cross-sectional side view of the tunable absorber-modulator device shown in FIG. 25A according to various embodiments.

FIGS. 25A-B another tunable absorber-modulator device. FIG. 25A is a schematic showing a top view of the tunable absorber-modulator device according to various embodiments. FIG. 25B is a schematic showing a cross-sectional side view of the tunable absorber-modulator device shown in FIG. 25A according to various embodiments.

The device may include a ferroelectric (e.g. BST) film 2502, a top ITO film 2504 on a first side of the BST film 2502, and a bottom ITO film 2506 on a second side of the BST film 2502 opposite the first side. The device may also include a silicon dioxide layer 2510 between the top ITO film 2504 and the BST film 2502. The device may also include a top contact 2514 in contact with the top ITO film 2504, and a bottom contact 2516 in contact with the bottom ITO film 2506. The bottom ITO film 2506 may be on a sapphire substrate 2512. The device may additionally include an array of ring resonators 2518, e.g. silicon ring resonators or a silicon metasurface, on the top ITO film 2504.

In this design, the top ITO film 2504, the BST film 2502, and the bottom ITO film 2506 may not be etched and the thickness of the BST film 2502 may be decreased to 300 nm. As the refractive index of the BST film 2502 is changed by applying a voltage between the bottom ITO film 2504 and the top ITO film 2502, the resonance wavelength of the resonator may be shifted from 996 to 980 nm as shown in FIG. 26.

Figure 26:
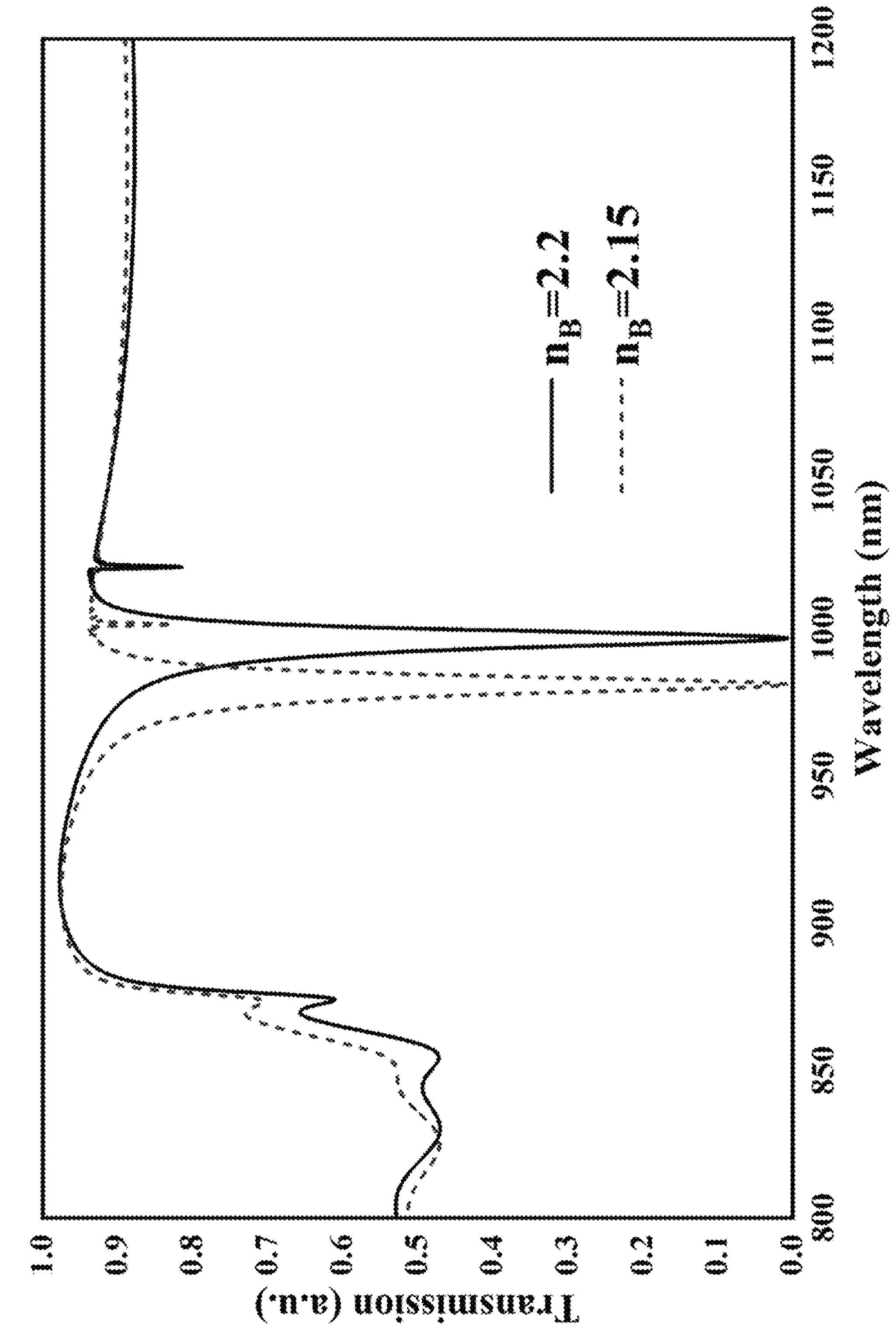
FIG. 26 is a plot of transmission (in arbitrary units or a.u.) as a function of wavelength (in nanometer or nm) illustrating the transmission spectra of the tunable absorber at different refractive indexes according to various embodiments.

FIG. 26 is a plot of transmission (in arbitrary units or a.u.) as a function of wavelength (in nanometer or nm) illustrating the transmission spectra of the tunable absorber at different refractive indexes according to various embodiments. The operational wavelength may be tuned by changing the diameter of the ring resonators or the metasurface.

Various embodiments may relate to a method to make electrically tunable flat optics by using ferroelectric thin film and transparent conducting oxide electrodes. The refractive index of the ferroelectric materials may be tuned by the applied electric field.

Various embodiments may relate to a method to make electrically tunable flat optics by using ferroelectric thin film and transparent conducting oxide electrodes, in which the electrodes are patterned in one or two-dimensional arrays. The electrodes may be of sub-wavelength size.

Various embodiments may relate to a method to make electrically tunable flat optics by using ferroelectric thin film and transparent conducting oxide electrode(s), in which the electrodes are formed by the corners of a polygon after being inscribed by a circle. The transparent conductive oxide electrode may be formed on the top side, or the bottom side, or both sides of a flat ferroelectric thin film.

Various embodiments may relate to a method to make electrically tunable flat optics by using ferroelectric thin film and transparent conducting oxide electrode, in which the electrode is formed on a ferroelectric thin film patterned in sub-wavelength features in an array.

In various embodiments, the electrically tunable flat optics, including a ferroelectric thin film and electrodes, may be fabricated on top of a distributed Bragg reflector (DBR), a broadband metallic mirror or directly on top of a substrate or stand-alone. The ferroelectric materials may be BST, BTO, PLZT, $LiNbO_3$, KTN etc. The substrate could be MgO, sapphire, LSAT, STO, $MgF_2$, Si, quartz, etc. the transparent conducting oxide can be ITO, FTO, AZO, BTO, $SrVO_3$, $CaV_2O_6$, nanotubes, graphene, etc.

Various embodiments may relate to a beam steering device structure including the ferroelectric active layer and patterned transparent conducting oxide electrodes array on a transparent substrate for electrically controlled beam steering in transmission mode operation. The ferroelectric layer may be as grown as a thin film or with sub-wavelength features.

Various embodiments may relate to a beam steering device structure including the ferroelectric active layer, a DBR and patterned transparent conducting oxide electrodes for electrically controlled beam steering in reflection mode operation. The ferroelectric layer may be as grown thin film or with sub-wavelength features.

Various embodiments may relate to a tunable lens structure including a ferroelectric thin film and patterned transparent conducting oxide electrodes for electrically controlled tuning of focusing. Either the transparent conducting oxide, or the ferroelectric film or both may be formed in a multi-ring shape for a lens function.

Various embodiments may relate to a tunable flat optics formed by a ferroelectric thin film in a circular shape and polygon shape electrodes that circumscribe the circular-shaped ferroelectric thin film. The electrodes may be separated and can be biased separately. The tunable flat optics may be used for both beam steering and tunable focusing lens. The electrode may be transparent conducting oxide or metal or other conducting material.

Various embodiments may relate to tunable flat optics including a ferroelectric thin film and transparent conducting oxide electrodes for electrically controlled light filtering and modulation. The ferroelectric film or the transparent conducting oxide electrodes or both can be patterned in sub-wavelength structure. The tunable flat optics may operate in transmission mode by using a transparent substrate or in reflection mode by using a DBR structure. The tunable flat optics may be used as a tunable filter or a modulator.

Various embodiments may relate to a light modulator structure including the metasurface, ferroelectric thin film and transparent conducting oxide electrodes for electrically controlled light filtering and modulation. The metasurface can be formed by e.g. Si, a-Si, SiN, $TiO_2$, $AlO_2$, AlN, GaP, GaN, $Nb_xO_y$, etc. The metasurface may be formed on top of a ferroelectric thin film with transparent conducting oxides as electrodes. The tunable flat optics may operate in transmission mode by using a transparent substrate or in reflection mode by using a DBR structure. The tunable flat optics may be used a tunable lens, a beam sweeper, a tunable filter or a modulator.

Various embodiments may relate to the application of ferroelectric material to flat optics for use in the visible and IR range. Various embodiments may relater to use of ferroelectric materials for active flat optics.

Various embodiments may relate to use of one material system working simultaneously as the constituent material to construct both the passive metasurface/flat optics structure and the active tuning part.

Various embodiments may relate to tunable flat optics formed by transparent conductive oxide deposited directly on a flat ferroelectric thin film surface without creating nano-pillars, disks, fins, silts, voids etc.

Various embodiments may relate to an electrode structure suggested for the tunable flat optics which may dramatically ease the fabrication challenge and greatly facilitate the realization of tunable flat optics.

Various embodiments may relate to beam steering devices, tunable lenses and/or modulators which may be different from conventional devices.

Various embodiments may be electrically tunable which make them much more compact and convenient for practical applications other than tuning methods.

Various embodiments may have much higher tuning speed than other methods, e.g. liquid crystal, microelectromechanical systems (MEMS), electro-thermal or charge accumulation in transparent conductive oxides (TCOs).

Various embodiments may make flat optics fabrication and electrical control in electrically tunable metasurface easier.

Various embodiments may operate in both reflection and transmission modes, and wavelength ranges from visible to IR.

Various embodiments may be complementary metal oxide semiconductor (CMOS) compatible.

By “comprising” it is meant including, but not limited to, whatever follows the word “comprising”. Thus, use of the term “comprising” indicates that the listed elements are required or mandatory, but that other elements are optional and may or may not be present.

By “consisting of” is meant including, and limited to, whatever follows the phrase “consisting of”. Thus, the phrase “consisting of” indicates that the listed elements are required or mandatory, and that no other elements may be present.

The inventions illustratively described herein may suitably be practiced in the absence of any element or elements, limitation or limitations, not specifically disclosed herein. Thus, for example, the terms “comprising”, “including”, “containing”, etc. shall be read expansively and without limitation. Additionally, the terms and expressions employed herein have been used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments and optional features, modification and variation of the inventions embodied therein herein disclosed may be resorted to by those skilled in the art, and that such modifications and variations are considered to be within the scope of this invention.

By “about” in relation to a given numerical value, such as for temperature and period of time, it is meant to include numerical values within 10% of the specified value.

The invention has been described broadly and generically herein. Each of the narrower species and sub-generic groupings falling within the generic disclosure also form part of the invention. This includes the generic description of the invention with a proviso or negative limitation removing any subject matter from the genus, regardless of whether or not the excised material is specifically recited herein.

Other embodiments are within the following claims and non-limiting examples. In addition, where features or aspects of the invention are described in terms of Markush groups, those skilled in the art will recognize that the invention is also thereby described in terms of any individual member or subgroup of members of the Markush group.

The invention claimed is:

1. A tunable optical device comprising:

a ferroelectric layer comprising a ferroelectric material;

a plurality of first electrodes forming a metasurface on a first side of the ferroelectric layer;

one common second electrode on a second side of the ferroelectric layer opposite the first side; and four first contacts configured to receive applied voltages, wherein the four first contacts are separate from the plurality of first electrodes and coupled to a cylindrical first electrode of the plurality of first electrodes, the cylindrical first electrode having a planar surface with a shape of the circle, such that each of the four first contacts are located at a respective corner region of a square and outside of the circle which is inscribed within the square, wherein a refractive index of the ferroelectric material is changeable in response to a potential difference applied between the plurality of first electrodes and the one common second electrode; and wherein the plurality of first electrodes and the one common second electrode are configured to allow visible light or infrared light to pass through.

2. The tunable optical device according to claim 1, wherein the ferroelectric material is barium strontium titanate (BST), barium titanate (BTO), lead lanthanum zirconate titanate (PLZT), lithium niobate ($LiNbO_3$), or potassium tantalate niobate (KTN).

3. The tunable optical device according to claim 1, wherein the plurality of first electrodes and the one common second electrode comprise a material selected from a group consisting of indium tin oxide (ITO), fluorine doped tin oxide (FTO), aluminum zinc oxide (AZO), barium titanate (BTO), strontium vanadate ($SrVO_3$), calcium vanadate ($CaV_2O_6$), carbon nanotubes, and graphene.

4. The tunable optical device according to claim 1, further comprising:

a bottom distributed Bragg reflector (DBR);

wherein the one common second electrode is over the distributed Bragg reflector (DBR), wherein the tunable optical device is configured to operate in a reflection mode.

5. The tunable optical device according to claim 4, further comprising:

a top distributed Bragg reflector (DBR), wherein the top distributed Bragg reflector (DBR) is over the ferroelectric layer, the plurality of first electrodes and the one common second electrode.

6. The tunable optical device according to claim 1, further comprising:

a substrate;

wherein the one common second electrode is over the substrate, wherein the substrate comprises magnesium oxide (MgO), sapphire ($Al_2O_3$), lanthanum aluminate-strontium aluminum tantalate (LSAT), strontium titanate (STO), magnesium fluoride ($MgF_2$), silicon, or quartz ($SiO_2$).

7. The tunable optical device according to claim 1, further comprising:

a broadband metallic mirror;

wherein the one common second electrode is over the broadband metallic mirror.

8. The tunable optical device according to claim 1, wherein the plurality of first electrodes comprise a plurality of sub-wavelength structures forming the metasurface.

9. The tunable optical device according to claim 1, wherein the plurality of first contacts are separate from each other.

10. The tunable optical device according to claim 1, further comprising:

an array of ring resonators on top of the plurality of first electrodes, wherein a diameter of the ring resonators tunes an operational wavelength of the tunable optical device.

11. The tunable optical device according to claim 1, further comprising:

a silicon oxide layer, disposed between the plurality of first electrodes and the ferroelectric layer.

12. A method of forming a tunable optical device, the method comprising:

forming a ferroelectric layer comprising a ferroelectric material;

forming a plurality of first electrodes on a first side of the ferroelectric layer;

forming one common second electrode on a second side of the ferroelectric layer opposite the first side; and forming four first contacts configured to receive applied voltages, wherein the four first contacts are separate from the plurality of first electrodes and coupled to a cylindrical first electrode of the plurality of first electrodes, the cylindrical first electrode having a planar surface with a shape of the circle, such that each of the four first contacts are located at a respective corner region of a square and outside of the circle which is inscribed within the square, wherein a refractive index of the ferroelectric material is changeable in response to a potential difference applied between the plurality of first electrodes and the one common second electrode; and wherein the plurality of first electrodes and the one common second electrode are configured to allow visible light or infrared light to pass through.

13. The method according to claim 12, further comprising:

forming a bottom distributed Bragg reflector (DBR);

wherein the one common second electrode is over the distributed Bragg reflector (DBR), wherein the tunable optical device is configured to operate in a reflection mode.

14. The method according to claim 13, further comprising:

forming a top distributed Bragg reflector (DBR), wherein the top distributed Bragg reflector (DBR) is over the ferroelectric layer, the plurality of first electrodes and the one e common second electrode.

15. The method according to claim 12, wherein the one common second electrode is formed over a substrate, wherein the substrate comprises magnesium oxide (MgO), sapphire ($Al_2O_3$), lanthanum aluminate—strontium aluminum tantalate (LSAT), strontium titanate (STO), magnesium fluoride ($MgF_2$), silicon, or quartz ($SiO_2$).

16. The method according to claim 12, wherein the one common second electrode is formed over a broadband metallic mirror.

17. The method according to claim 12, wherein the plurality of first electrodes comprise a plurality of sub-wavelength structures forming the metasurface.

18. The method according to claim 12, wherein the plurality of first contacts are separate from each other.

* * * * *